United States Patent
Soffer et al.

(10) Patent No.: US 10,958,983 B1
(45) Date of Patent: Mar. 23, 2021

(54) METHOD AND SYSTEM OF SECURE MEDIATOR FOR ADVANCED DISPLAYS

(71) Applicant: HIGH SEC LABS LTD., Caesarea (IL)

(72) Inventors: Aviv Soffer, Caesarea (IL); David Hirshberg, Haifa (IL)

(73) Assignee: HIGH SEC LABS LTD., Caesarea (IL)

( * ) Notice: Subject to any disclaimer, the term of this patent is extended or adjusted under 35 U.S.C. 154(b) by 0 days.

(21) Appl. No.: 17/099,812

(22) Filed: Nov. 17, 2020

(51) Int. Cl.
*H04N 21/647* (2011.01)
*H04N 21/835* (2011.01)

(52) U.S. Cl.
CPC ..... *H04N 21/64715* (2013.01); *H04N 21/835* (2013.01)

(58) Field of Classification Search
CPC .............. G06F 13/107; G06F 13/4282; G06F 2009/45562; G06F 2009/45595; G06F 21/56; G06F 21/82; G06F 2213/00; G06F 2213/0008; G06F 2213/0024; G06F 2213/0028; G06F 2213/0032; G06F 2213/0036; G06F 2213/0042; G06F 9/45504; G06F 9/45558; H04L 41/0806; H04L 41/5019; H04L 41/5041; H04L 41/5096; H04L 63/0272; H04L 63/08; Y04S 40/20; H04N 21/64715; H04N 21/835
See application file for complete search history.

(56) References Cited

U.S. PATENT DOCUMENTS

| | | | |
|---|---|---|---|
| 8,769,172 B2 | 7/2014 | Soffer et al. | |
| 9,411,766 B2 | 8/2016 | Soffer | |
| 9,501,157 B2 | 11/2016 | Soffer | |
| 9,767,049 B2 | 9/2017 | Soffer et al. | |
| 10,515,234 B2 | 12/2019 | Soffer | |
| 2018/0225230 A1* | 8/2018 | Litichever | ............... G06F 21/82 |
| 2018/0293197 A1* | 10/2018 | Grobelny | ............ G06F 13/4291 |

* cited by examiner

*Primary Examiner* — Omar S Parra
(74) *Attorney, Agent, or Firm* — Alphapatent Associates, Ltd; Daniel J. Swirsky

(57) ABSTRACT

Mediating between host and display where a mediator enforces security policy over bidirectional protocols of a Display Data Channel (DDC) of video communication protocols between host and display, where AD-EDID display emulators are coupled to DDCs of the host's video port, AD-EDID host emulators are coupled to DDCs of display's video port and security enforcing communication units couple between pairs of AD-EDID display emulator and AD-EDID host emulator, where AD-EDID display emulators emulate display operation and behavior over the DDC, AD-EDID host emulators emulate host operation and behavior over the DDC and security enforcing communication units enforce security policy such as unidirectional communication between the pairs of AD-EDID host emulators and AD-EDID display emulators.

26 Claims, 8 Drawing Sheets

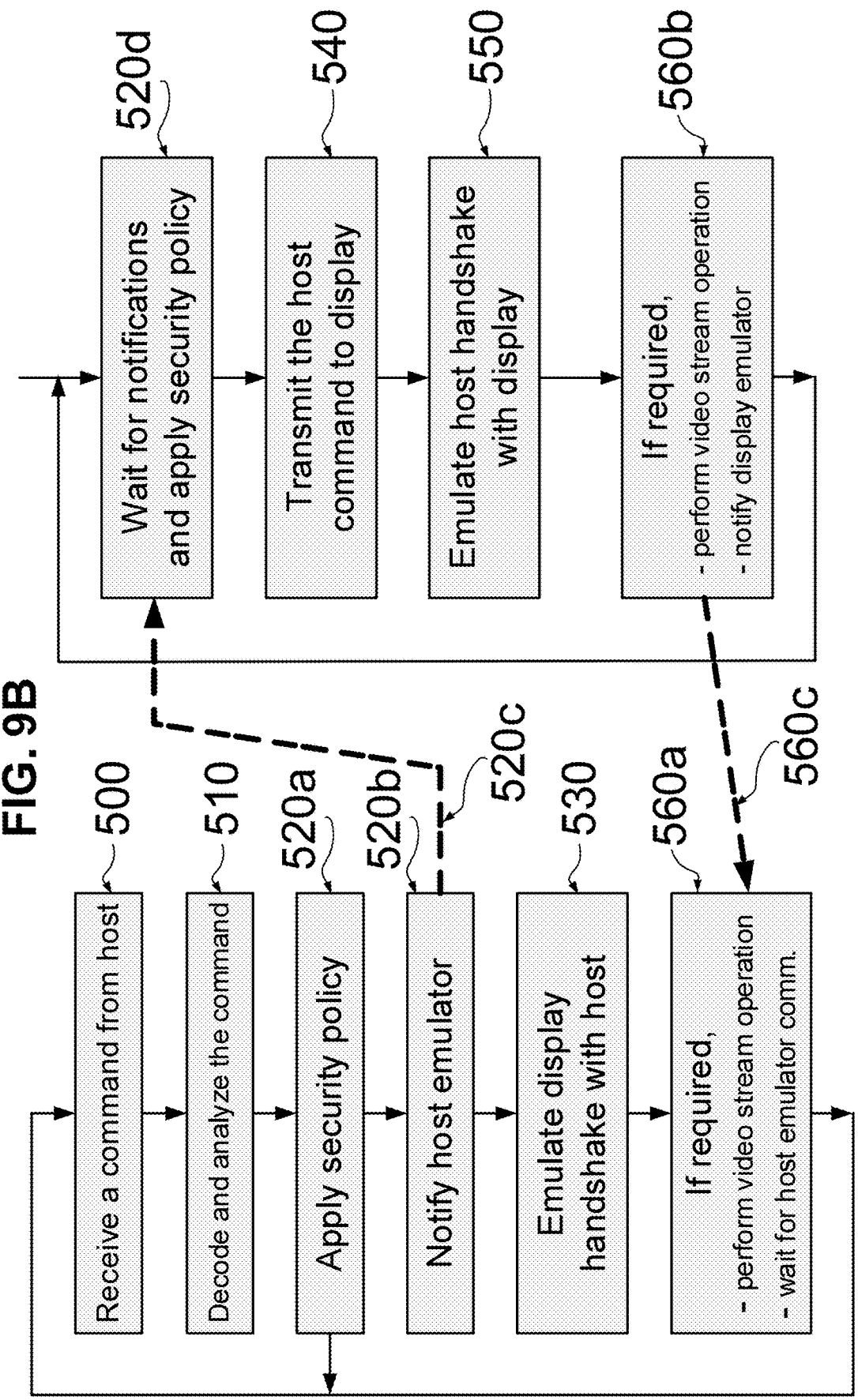

METHOD AND SYSTEM OF SECURE MEDIATOR FOR ADVANCED DISPLAYS

FIELD AND BACKGROUND

The present invention, in some embodiments thereof, relates to a video mediator between a host and a display and, more particularly, but not exclusively, to a secure video mediator between a host and an advanced display.

A video mediator is a device that coupled between a host and a display. The host may be a computer, a workstation, a set-top-box, etc. The display may be a computer monitor, a television, a projector, etc. Host and display are typically connected using video communication protocols, such as, VGA, DVI, HDMI or DisplayPort. The video communication protocol may include, in addition to the video stream, plug and play data as well as other data. The plug and play data and some of the other data are referred as Display Data Channel (DDC). Video mediators are used for applications like video standards conversion, extending the distance between host and display, switching the video stream between sources (hosts) and sinks (displays) etc. In some cases, the mediator comprises some security functions to protect the overall system from cyber threats. Such a mediator is referred as secure mediator. Examples of secure functions of mediators can be found in U.S. Pat. Nos. 8,769,172, 9,411,766, 9,767,049, 10,515,234 and 9,501,157 titled "Secure KVM Device Ensuring Isolation of Host Computers", "Single Optical Fiber KVM Extender", "Isolated KVM Combiner for Multi-Network Computer System having a Video Processor", "Method and Apparatus for Securing KVM Matrix" and "Secure KVM System having Multiple Emulated EDID Functions", respectively. An objective of this invention is to provide secure video mediators that enhance the security over Display Data Channel (DDC) that couple between hosts and displays with advanced display features, i.e., advanced display that are characterized by supporting features that requires bidirectional communication between host and display over Display Data Channel (DDC).

SUMMARY

According to an aspect of some embodiments of the present invention there is provided a secure mediator for video communication protocol that apply security policy over a bidirectional communication protocols in the Display Data Channel (DDC) of video communication protocol.

According to an aspect of some embodiments of the present invention there is provided an advanced display (AD) secure mediator for coupling between one or more hosts and one or more displays over video communication protocols comprises: one or more input video circuits configured to receive from video channels of the video communication protocols that are coupled to the hosts, one or more output video circuits configured to transmit to video channels of the video communication protocols that are coupled to the displays, one or more AD-EDID display emulators configured to be coupled to Display Data Channels (DDCs) of the video communication protocols that are coupled to the hosts, one or more AD-EDID host emulators configured to be coupled to Display Data Channels (DDCs) of the video communication protocols that are coupled to the displays, and security enforcing communication units that are configured to couple between one or more pairs of AD-EDID display emulator and AD-EDID host emulator, wherein each of the AD-EDID host emulators is configured to perform bidirectional communication over the DDC with the advanced display and emulate host operation and behavior, each of the AD-EDID display emulators is configured to perform bidirectional communication over the DDC with the host and emulate display operation and behavior, the mediator is configured to couple video streams from input video circuits to output video circuits and condition upon the emulators operations effect the video streams, and the security enforcing communication units are configured to perform security functions from at least one of or any combination of (1) enforcing unidirectional communication between the pairs of AD-EDID host emulators and AD-EDID display emulators, (2) authenticating the pairs of AD-EDID host emulators and AD-EDID display emulators, (3) blocking or filtering out undesired data transmission between the pairs of AD-EDID host emulators and AD-EDID display emulators, (4) blocking, locking, neutralizing or stopping the communication between the pairs of AD-EDID host emulators and AD-EDID display emulators, (5) encrypting and decrypting the communication between the pairs of AD-EDID host emulators and AD-EDID display emulators, (6) logging, auditing or alerting events, (7) auditing the communication between the AD-EDID host emulators and the AD-EDID display emulators, (8) analyzing the communication between the AD-EDID host emulators and the AD-EDID display emulators, (9) preventing data transfer between non-paired emulators, (10) preventing signal leakage between the emulators, (11) encoding and decoding display mode information and messages between the AD-EDID host emulators and the AD-EDID display emulators, (12) isolating between the DDCs of the hosts, and (13) isolating the communication between different pairs of AD-EDID display emulators and the AD-EDID host emulators.

According to some embodiments of the invention, the bidirectional communication over the DDC is at least one of MCCS, SCDC, or both.

According to some embodiments of the invention, the mediator further supports one or more consoles comprising one or more peripheral devices.

According to some embodiments of the invention, the mediator further comprises a host side enclosure and a console side enclosure and the host side enclosure coupled to the console side enclosure by intra-communication protocol.

According to some embodiments of the invention, the mediator is a video format converter.

According to some embodiments of the invention, the mediator is a distance extender.

According to some embodiments of the invention, the mediator is a video switch.

According to some embodiments of the invention, the mediator stores a table with the state of at least one of or any combination of (1) display mode, (2) clocking scheme, (3) MCCS data space, and (4) SCDC data space, in each event of switching active host.

According to some embodiments of the invention, the mediator is a KVM switch.

According to some embodiments of the invention, the mediator is a console switch.

According to some embodiments of the invention, the mediator is a video combiner.

According to some embodiments of the invention, the AD secure mediator, wherein the mediator is a KVM matrix.

According to some embodiments of the invention, the mediator support legacy EDID security function of allowing the host to only read a copy of the display EDID data that was copied at power up or reset.

According to some embodiments of the invention, the mediator further comprises one or more switches that are configured to block the video stream from the hosts to the displays.

According to some embodiments of the invention, the AD-EDID display emulators are configured to perform security functions from at least one of or any combination of (1) blocking or filtering out host commands, (2) emulating E-EDID data on behalf of the display, (3) updating or changing a copy of E-EDID data read from the display, (4) controlling the video stream between the host and the display, and (5) applying security policy for handshaking with the hosts.

According to some embodiments of the invention, the AD-EDID host emulators is configured to perform security functions from at least one of or any combination of (1) blocking or filtering out commands directed to the display, (2) emulate bidirectional communication on behalf of the host, (3) updating or changing a copy of E-EDID data read from the display, (4) controlling the video stream between the host and the display, and (5) apply security policy for handshaking with the display.

According to an aspect of some embodiments of the present invention there is provided a method for coupling host to advance display by an advanced display secure mediator, the coupling is made using video communication protocol comprises video channel and Display Data Channel (DDC), the method comprises the steps of: (a) receiving a command from the host through the DDC, (b) detecting and analyzing the command, (c) applying security policy to the command and upon compliance with security policy performing the following steps: (d) emulating the behavior of the advanced display and performing a handshake with the host, (e) transmitting the command to the advanced display through the DDC, (f) emulating the behavior of the host in front of the advanced display and performing a handshake with the advanced display, and (g) if required or desired, performing operation on a video stream of the video communication protocol.

According to some embodiments of the invention, the method, wherein the security policy further comprises one of or any combination of (1) enforcing unidirectional communication between display-side DDC and host-side DDC, (2) blocking or filtering out undesired data transmission between display-side DDC and host-side DDC, (3) logging, auditing, or alerting events, (4) analyzing DDC communication between host and the mediator, (5) analyzing DDC communication between display and the mediator, (6) preventing transfer of data between DDCs of different hosts, and (7) preventing transfer of data between DDCs of different displays.

According to some embodiments of the invention, the method wherein the advanced display secure mediator further comprises: one or more AD-EDID display emulators configured to be coupled to DDCs of the video communication protocols that are coupled to one or more hosts, one or more AD-EDID host emulators configured to be coupled to DDCs of the video communication protocols that are coupled to one or more displays and security enforcing communication units that are configured to couple between pairs of AD-EDID display emulator and AD-EDID host emulator, wherein the steps (a), (b) and (d) are performed by the AD-EDID display emulator, and steps (e) and (f) are performed by the AD-EDID host emulator.

According to some embodiments of the invention, the method, wherein step (c) is performed by at least one of or any combination of: (i) AD-EDID display emulators, (ii) AD-EDID host emulators, and (iii) security enforcing communication units, and wherein the security policy further comprises one of or any combination of: (1) enforcing unidirectional communication between the pairs of AD-EDID host emulators and AD-EDID display emulators, (2) authenticating the pairs of the AD-EDID host emulators and the AD-EDID display emulators, (3) blocking or filtering out undesired data transmission between the pairs of AD-EDID host emulators and AD-EDID display emulators, (4) blocking, locking, neutralizing or stopping communication between the pairs of AD-EDID host emulators and AD-EDID display emulators, (5) encrypting and decrypting communication between the pairs of AD-EDID host emulators and AD-EDID display emulators, (6) logging, auditing and alerting events created by the hosts or the displays, (7) analyzing communication between AD-EDID host emulators and AD-EDID display emulators, (8) preventing data transfer between non-paired emulators, (9) preventing signal leakage between emulators, (10) encoding, decoding, encrypting and decrypting messages between AD-EDID host emulators and AD-EDID display emulators, (11) isolating between the DDCs of the hosts, and (12) isolating communication links between the pairs of AD-EDID display emulators and AD-EDID host emulators.

According to some embodiments of the invention, step (g) is performed by at least one of or any combination of (1) AD-EDID display emulators, (2) AD-EDID host emulators, and (3) security enforcing communication units.

According to some embodiments of the invention, the method further comprising a step of coordination between the pairs of AD-EDID display emulators and AD-EDID host emulators, through security enforcing communication units.

According to some embodiments of the invention, the advanced display secure mediator is a KVM switch.

According to some embodiments of the invention, the advanced display secure mediator is a video combiner.

According to some embodiments of the invention, the advanced display secure mediator is a KVM matrix.

According to some embodiments of the invention, the method further comprises the steps of copying EDID data from legacy display into an internal storage at power up or reset and allowing only reading of EDID data by the host from the copy in the internal storage.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 9B is a flow chart of the method of securing the DDC in AD secure mediator with AD-EDID host emulator and AD-EDID display emulator;

Figure 1:
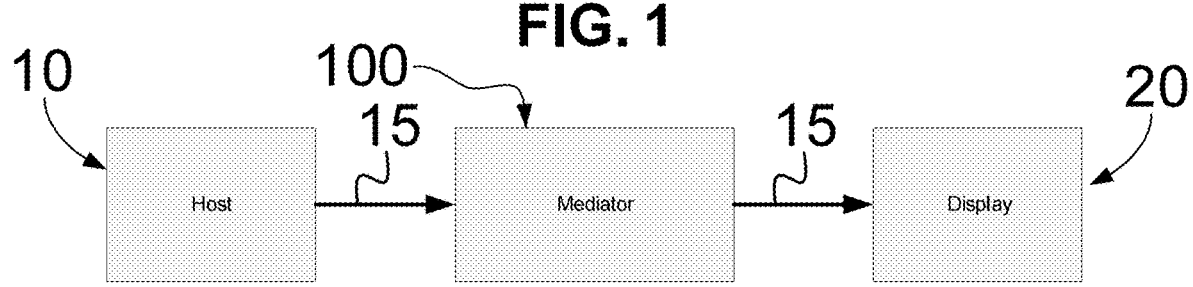
FIG. 1 is a schematic illustration of a mediator coupling between a host and a display.

It will be appreciated that for simplicity and clarity of illustration, where considered appropriate, reference numerals may be repeated among the figures to indicate corresponding or analogous elements.

DETAILED DESCRIPTION

The present invention, in some embodiments thereof, relates to a video mediator between host and display and, more particularly, but not exclusively, to a secure video mediator between host and advanced display.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a mediator for a display. The mediator coupled between a host 10 and a display 20. As used herein, the term "host computer", or in short "host", means video signal source, e.g., a computer, a workstation, a set-top-box, and the like. As used herein, the term "display" means any device that receives the video signal from the source and converts that signal to a visible image, e.g., a computer monitor, a television, a video projector, 3D display, Virtual Reality headset display, and the like. The display, also referred as a computer monitor, may use verity of technologies for displaying the visual information, such as, a Cathode Ray Tube (CRT), a flat panel display, or the like. The flat panel display may be implemented using Plasma technologies, LCD technologies, LED technologies or the like.

The video data transfer from host 10 to display 20 is carried by a video communication protocol 15. The video communication protocol 15, may be analog such as VGA or digital such as DVI, HDMI or DisplayPort (DP) or the like. The video communication protocol 15 may include, in addition to the video stream, other data such as audio as well as other types of data. For example, video communication protocol 15 may include data for "plug and play" experience that are a collection of protocols for digital communication between the display and the host that enable the display to communicate, among other information, the data described the supported display modes to the host. This information enables the computer host to generate video signal that will be able to be presented at the display. Other information may enable the computer host to adjust monitor parameters, such as brightness and contrast. The collection of protocols refers, in many cases, as well as be used herein as a DDC—Display Data Channel. The DDC may be integrated into the video communication protocol 15 in several ways dependent on the specific type video communication protocol 15. In some cases, such as in DVI, HDMI and DP, the connectors of the video communication protocol 15 include dedicated pins for the display data channel (DDC). In DisplayPort video communication protocol, the DDC is also referred as the auxiliary channel.

Mediator 100 may be used between host 10 and display 20 for many reasons. For example, Mediator 100 may be used to convert between video protocols or for extend the allowable distance between host 10 and display 20. Mediator 100 may support additional types of devices in addition to displays as illustrated hereinafter.

Figure 2:
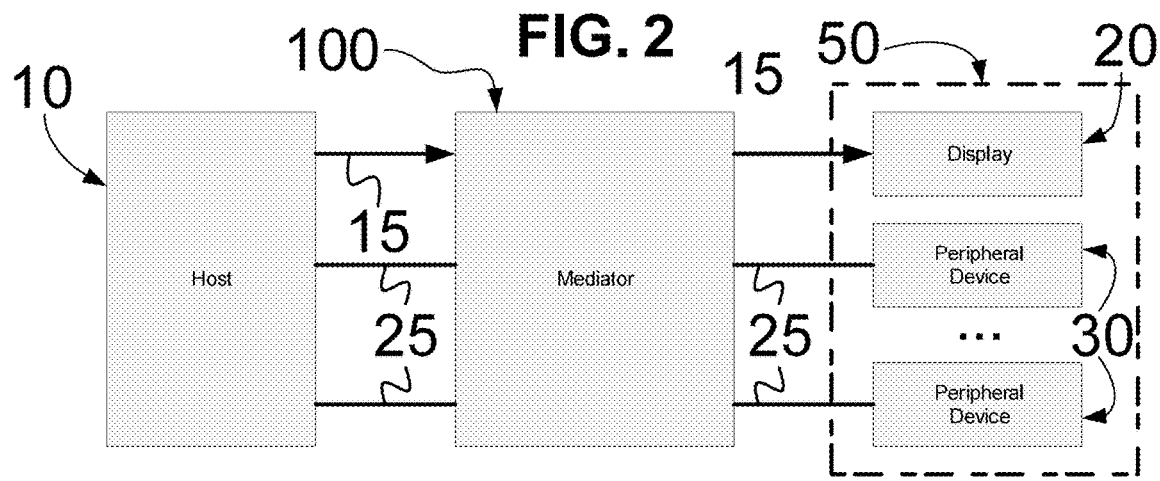
FIG. 2 is an illustration of a mediator for a console.

Reference is now made to FIG. 2. FIG. 2 illustrates a mediator for a console 50. As used herein the term "console" means a collection (set) of peripheral devices, such as keyboard, mouse and display 20 that are used by a user to interact with host 10. The peripheral devices 30 of console 50 typically reside on the user's desktop or in a close proximity to the user, e.g., in a single room. The console may include a display 20, or a plurality of displays 20, connected to the host via one or more video communication protocols 15. Console devices may include printers, cameras, microphones, speakers, smart card readers, biometric identification devices, external mass storage devices, USB dongles, mobile terminals such as smartphones and the like. Such console 50 devices are coupled to host 10 using peripheral devices communication protocols 25.

Peripheral devices communication protocols 25 may be parallel buses, serial buses, Universal Serial Bus (USB), and many other types of communication protocols, such as SPI, I2C, CAN bus, SCSI, Fiber Channel (FC), IDE, ATA, PCI, PCI-x, IEEE 1394 (Firewire), Ethernet, Thunderbolt, Infini-Band and the like. In some cases, peripheral devices communication protocols 25 may be used to coupled host 10 to display 20 instead of the more specific video communication protocols 15, e.g., USB 3.0 communication protocol may be used to coupled host 10 to display 20. In an exemplary embodiment of the invention, video communication protocols 15 is replaced or integrated into peripheral devices communication protocols 25.

In an exemplary embodiment of the invention, video communication protocols 15 and peripheral devices communication protocols 25 may be wireless protocols such as Wi-Fi, Bluetooth, Zigbee and the like.

In the embodiments illustrated in FIGS. 1 and 2, mediator 100 have been implemented in a single enclosure. As demonstrated next, mediator 100 may be implemented by a plurality of coupled components that are enclosed separately and may be in proximity to each other or far apart from each other.

Figure 3:
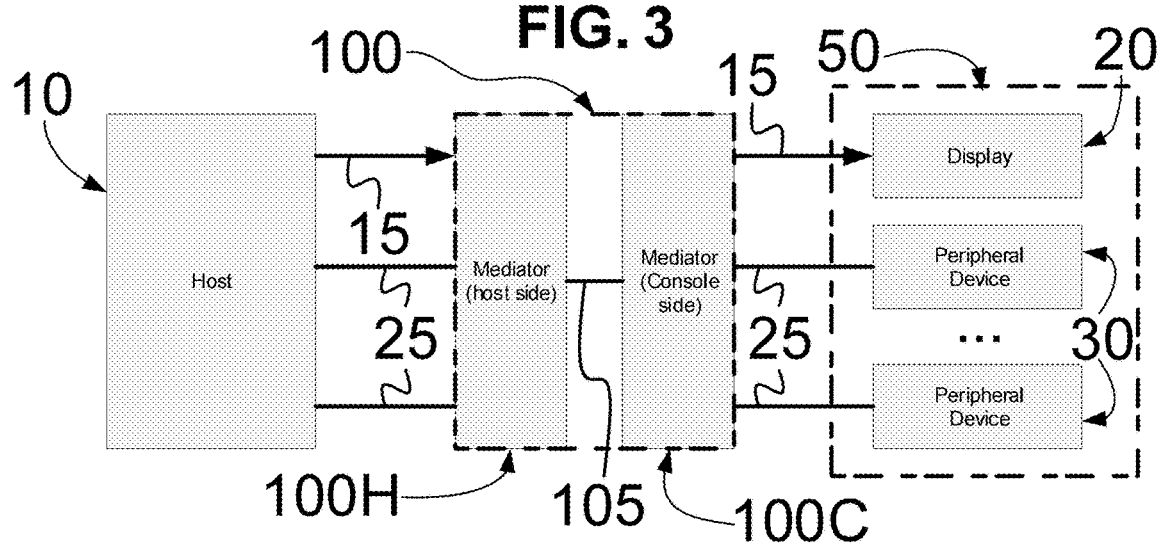
FIG. 3 is an illustration of a mediator comprising two separate enclosures: host side mediator and console side mediator.

Reference is now made to FIG. 3. FIG. 3 illustrates a mediator 100 comprising two separate enclosures: host side mediator 100H and console side mediator 100C. The two parts of mediator 100 communicate between each other using intra-communication protocol 105. Intra-communication protocol 105 may contain a plurality of channels and may be implemented with proprietary protocol or one or more of the communication protocols mentioned hereinabove. An example of such type of mediator, implemented with this partition, is an extender. The extender is a device that enables host 10 to be deployed further away from console 50. An example of secure extender can be found in U.S. Pat. No. 9,411,766 titled "Single Optical Fiber KVM Extender". In many cases, video communication protocols 15 and peripheral devices communication protocols 25 are limited to a distance of few meters or even less. Mediator 100 (the extender device), enables much longer distance between host 10 and console 50. For example, if intra-communication protocol 105 is an optical fiber, a distance of hundreds of meters to tens of kilometers and even more is achievable. Alternatively, if intra-communication protocol 105 is the Internet Protocol (IP) and host side mediator 100H and console side mediator 100C are connected to the Internet, host 10 and console 50 may be deployed anywhere. In an exemplary embodiment of the invention, the number of separate enclosers of mediator 100 is not limited to two enclosures.

Figure 4:
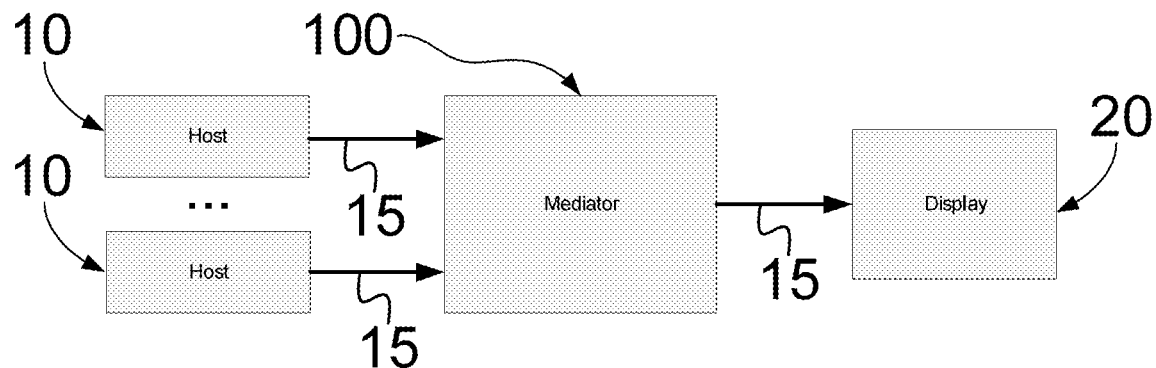
FIG. 4 is an illustration of a mediator supporting a plurality of hosts.

Reference is now made to FIG. 4. FIG. 4 illustrates a mediator 100 supporting a plurality of hosts. An example for such mediator may be a video switch that allow the user to switch between the plurality of the video sources into a single display. Another example may be a video combiner which combines the plurality of the video sources into a single video stream that is presented on the single display. An example of secure video combiner can be found in U.S. Pat. No. 9,767,049 titled "Isolated KVM Combiner for Multi-Network Computer System having a Video Processor". The video combining may be done by splitting the display screen to several fixed regions or having windows of each video sources over a background video known in the art as PIP (Picture in Picture). In an exemplary embodiment of the invention, mediator 100 may couple a plurality of hosts 10 to console 50 including, in addition to the display 20, other peripheral devices 30. In specific, the peripheral devices 30 may be keyboard and mouse. Mediator with this set of peripherals is known in the art as KVM switch. An example of secure KVM switch can be found in U.S. Pat. No. 8,769,172 titled "Secure KVM Device Ensuring Isolation of Host Computers".

Figure 5:
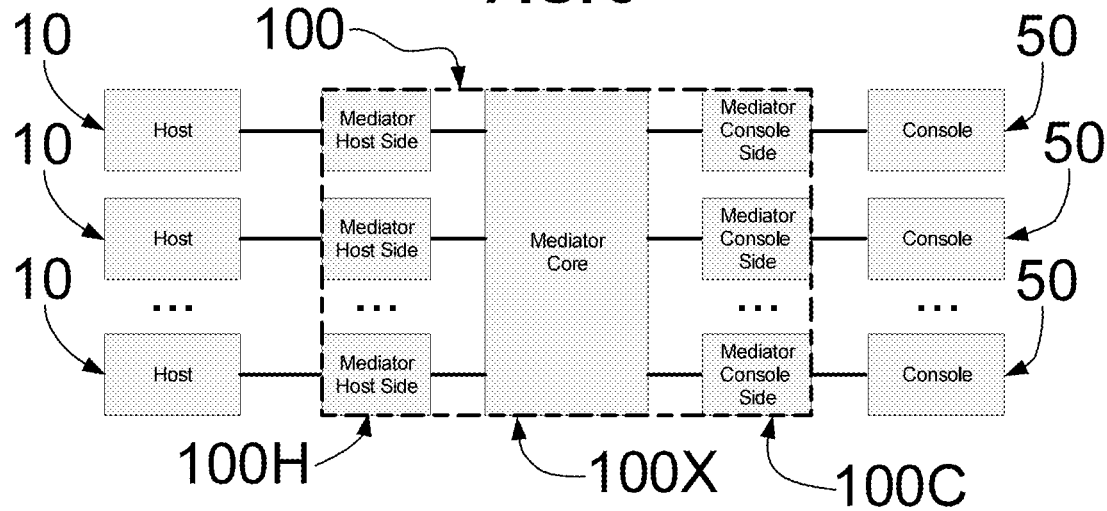
FIG. 5 is an illustration of a mediator supporting a plurality of hosts and a plurality of consoles.

Reference is now made to FIG. 5. FIG. 5 illustrates a mediator 100 supporting a plurality of hosts 10 and a plurality of consoles 50. Mediator 100 may be partitioned to a plurality of enclosures. In an exemplary embodiment of the invention, mediator 100 comprises a plurality of host side mediator enclosures 100H, a plurality of console side mediator enclosures 100C and a core mediator enclosure 100X. An example for such type of mediator is KVM matrix. KVM matrix enables a plurality of users, typically located apart from each other, control a plurality of hosts, typically deployed in a computing farm that is in a separate location than the user's locations. An example of secure KVM matrix can be found in U.S. Pat. No. 10,515,234 titled "Method and Apparatus for Securing KVM Matrix".

In an exemplary embodiment of the invention, the host side mediator enclosures 100H are located in proximity to the hosts 10 and the console side mediator enclosures 100C is located in proximity to the consoles 50. The core mediator enclosures 100X is located in a third location, separate from both the hosts 10 and the consoles 50. In an exemplary embodiment of the invention, console 50 comprises one or more displays.

Figure 6:
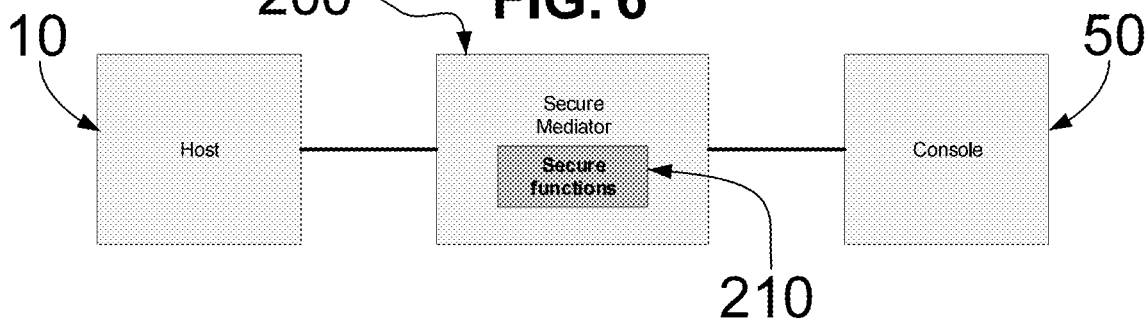
FIG. 6 is an illustration of a secure mediator comprising security functions.

Reference is now made to FIG. 6. FIG. 6 illustrates a secure mediator 200. A secure mediator is a mediator comprises security functions 210. Secure mediator 200 may support a single host 10 or a plurality of hosts 10. Secure mediator 200 may support a single console 50 or a plurality of consoles 50. Secure mediator 200 may comprise a single enclosure or partitioned to a plurality of enclosers as illustrated in FIG. 1-FIG. 5. Secure mediator 200 may support consoles 50 with variety of peripheral devices as described hereinabove. Secure mediator 200 may support one or more displays 20 in console 50. Security functions 210 in secure mediator 200 may include but not limited to: (1) isolating (i.e., illuminate undesired signal leakage between host and console); (2) isolating between hosts connected to the secure mediator; (3) isolating between consoles connected to the secure mediator; (4) enforcing unidirectional flow of data between host and console, on one or more communication protocols between host and console; (5) emulate console device on the host side of the secure mediator; (6) emulate host on the console side of the secure mediator; (7) authenticate devices and hosts; (8) block, lock, neutralize and/or stop connection of unauthorized peripherals devices; (9) filter undesired data transmitted between hosts and consoles; (10) providing antitampering features; (11) preventing malicious code insertion, e.g., by having non-programable firmware; (12) logging, auditing and sending alerts for events occurring during mediator operation.

Figure 7:
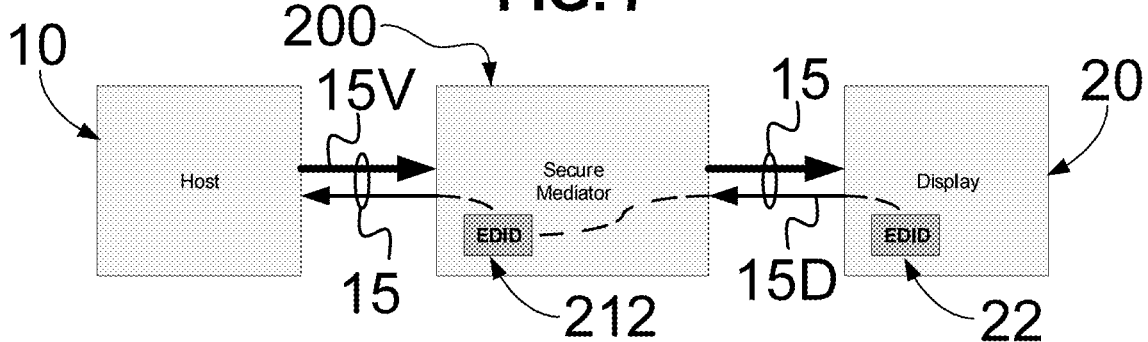
FIG. 7 is an illustration of a secure mediator that supports at least one display.

Reference is now made to FIG. 7. FIG. 7 illustrates a secure mediator 200 supporting at least one display 20. Display 20 is connected to host 10 by video communication protocol 15. Video communication protocol 15 comprises the video channel 15V, i.e. the video stream, that transfer visual data from the host to the display. In addition, video communication protocol 15 comprises a Display Data Channel (DDC) 15D. A typical DDC interface in the display side is implemented by a memory 22 storing data in a standard format referred as Extended Display Identification Data (EDID). EDID is typically accessible via an I²C-bus. Host 10 can read EDID memory 22 to know what is the kind, and what are the parameters, of display 20 that host 10 is coupled to. The EDID data may include manufacturer name, serial number, product type, resolution and timings supported by display 20 and the like. The EDID data main purpose is to allow host 10 to generate the compatible video stream characteristics to match the capabilities of display 20.

As used herein the term "Display Data Channel" or in short "DDC" (referral 15D in the drawings) means any channel of video communication protocol 15 that is used today or will be used in the future to support plug and play functionalities, as well as additional control and status protocols. In specific, DDC refers to any protocol that is used to transport EDID data, Enhanced EDID data, as well as any enhancement, extension or successor of EDID data. Examples of DDC 15D communication standards in use are I2C (used in DVI and HDMI standards) and auxiliary channel (used in DisplayPort standard). At the present time, DVI, HDMI and DP are all use EDID and Enhanced EDID (E-EDID) as their underlining data structure. Any video communication protocol comprising a channel that convey newer version, enhancement, extension or successor of EDID data are intended to be covered by the term DDC.

In secure mediator 200 that supports one or more displays 20, a common secure function related to the DDC channel 15D and EDID memory 22 is the security scheme illustrated in FIG. 7 and described hereinafter. Secure mediator 200 comprises an EDID memory 212. Upon power-on, restart, or other similar triggers, the EDID data is copied form memory 22 to memory 212. Host 10 can only read EDID memory 212, i.e., write transactions to EDID memory 212 are forbidden or banned. Moreover, host 10 does not have any access to EDID memory 22 of display 20. More information on this type secure functionality of DDC 15D can be found in U.S. Pat. No. 9,501,157 titled "Secure KVM System having Multiple Emulated EDID Functions". This scheme enables the host 10 to identify which display coupled to host 10 and allows host 10 to generate a suitable video signal which is supported by display 20. This security scheme disables the ability of host 10 to write data in display's EDID memory 22.

EDID was developed by VESA—the Video Electronics Standards Association, and introduced in 1994. The original standard defined 128-byte data structure. As display types and capabilities increased, 128 bytes became insufficient, and EDID were extended so that multiple 128-byte data blocks could be stored. This is known as Enhanced EDID (E-EDID). Some E-EDID versions are merely additional read-only information that do not cope any new challenges to a secure mediator 200. The implication, in this case, is just to increase the size of the EDID memory 212.

Other E-EDID enhancements are more challenging with respect to security. Some enhancements are involved with host write operation to the E-EDID address space, others are involved in sequences of write and read operations, i.e., handshaking. In such cases, new approaches for securing the DDC need to be taken. One example for E-EDID that incorporated both read and write of E-EDID data information is Monitor Control Command Set (MCCS). MCCS is a VESA standard way to adject display parameters such as brightness and contrast by a host. In secure mediator 200 a straight forward blocking security strategy is used. When the host tries to write an MCCS command or information through the DDC 15D to the display, secure mediator 200 simply disallow the write commands. While blocking secure policy for MCCS is acceptable by most secure users, in more recent E-EDID enhancements, such as, Status and Control Data Channel (SCDC), which was introduced in HDMI standard 2.0, blocking approach is less acceptable and securing SCDC protocol need to be addressed differently. It is an objective of this invention to provide secure mediation support to SCDC, MCCS and any other present or future protocols that use DDC and/or E-EDID with write and/or write/read (handshaking) operations.

SCDC was introduced, for among other goals, to support high definition, high refresh rate displays, such as "4K60" (3840×2160 pixels resolution, known also as Ultra High Definition—UHD) with 60 fps (frames per second) in HDMI version 2.0 and above. In high rate of pixels data that are needed to be transmitted from source (host) to destination (display), the legacy (i.e., pre-HDMI 2.0) data bit rate of the serial links of video communication protocol 15 (HDMI in this case) is not sufficient to transfer the required video data. To overcome this problem a higher clock rate in the serial links is used.

In SCDC protocol, the changing of the serial links clock rate is performed by handshake protocol between host 10 and display 20. Since the relationship between the clock frequency of the clock lines and the bit rate in the video stream data lines is changed from 1/10 to 1/40 and a data scrambler needs to be activated, handshake protocol over DDC is used. In order to make this change, the host needs to inform the display on the intention to transfer video data with a higher clock rate and the display needs to get ready (e.g., set PLLs to a different multiply of the basic clock, set scramblers and wait for these PLLs to be locked). When the display is ready to receive the higher data rate video signals, the display acknowledges back to the host that the host can start transmitting the high data rate video signals.

SCDC is designed to support handshake protocols, i.e., bidirectional communication, over DDC using I2C protocol and E-EDID data structure. The bidirectional communication is implemented using write and read operations over the display's E-EDID memory space and the display may dynamically change the data in the memory. SCDC enables upgrading the maximum transmission bit rate on the HDMI video protocol from 10.2 Gbit/s to 18 Gbit/s allowing support of higher definition, higher refresh rate displays. Due to the fact that higher definition with higher refresh rate display modes gain more and more popularity, secure mediators require to support advanced displays with higher resolutions and higher refresh rates. Supporting these advanced displays is expected by the secure mediator customers and not supporting this fast-becoming mainstream displays is not acceptable by the secure mediator customers. Henceforth, a solution to support handshake protocols such as SCDC in secured manner for secure mediator is required.

As used herein, the term "Advanced Display" means a display that, in at least one function or one mode of operation, requires bidirectional communication over DDC and optionally perform handshake with the host. The bidirectional handshake may be a protocol over DDC or the like. The bidirectional handshake may comply with E-EDID protocol or the like. The bidirectional handshake may comply with Status and Control Data Channel (SCDC) protocol or the like. The bidirectional handshake may be required to support the switching of video channel 15V to higher bit rate transmission. This bit rate switching may require coordination with the display. The higher bit rate display modes (i.e., higher resolution coupled with higher refresh rate) typically related to a requirement of more than 10 Gbit/s of raw video data rate. For example, one such popular display mode is 4K (3840×2160) pixels at 60 fps video mode, referred hereinafter as "4K60 display mode" or in short "4K60".

As an example of advanced displays is a HDMI 2.0 display that support bidirectional handshake protocol over DDC with E-EDID type of protocol. In specific, a display supporting HDMI 2.0 video communication protocol and support 4K60 display mode is an advanced display.

Hereinbelow, the present application teaches a family of secure functions for securing DDC in secure mediators that support advanced displays.

As used herein the term "advanced display secure mediator", or for brevity, "AD secure mediator" is any type of mediator, as described hereinabove in FIGS. 1-7 and the accompanying description, that provides the following:
supports one or more advanced displays;
comprises secure functions for DDC as describe hereinafter.

As used herein the term "legacy display" is any type of display that is not advanced display and do not support bidirectional communication protocol over DDC or the like. The term legacy EDID security function is the DDC security function as described hereinabove in FIG. 7 and the accompanying description.

Figure 8A:
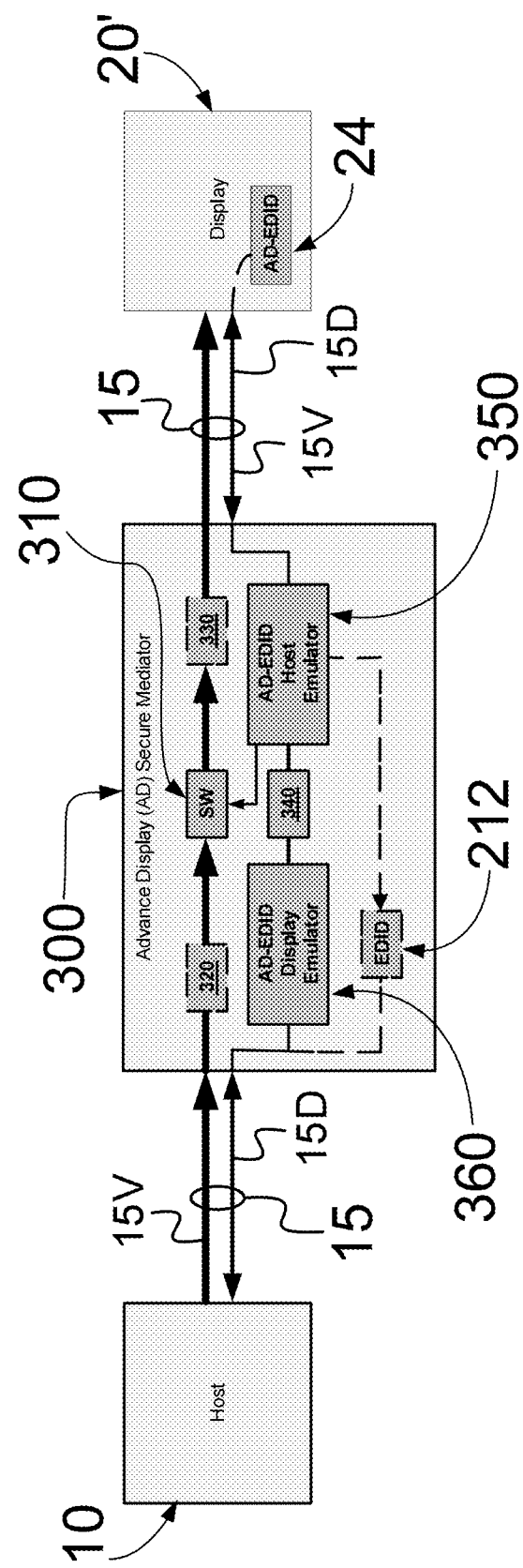
FIG. 8A is an illustration of an advanced display secure mediator.

Reference is now made to FIG. 8A. FIG. 8A illustrates an AD secure mediator with accordance to the present invention. AD secure mediator 300 is connected to advanced display 20'. Advanced display 20' comprises EDID interface 24, hereinafter, AD-EDID interface 24. AD-EDID interface support legacy display EDID read operation as well as legacy E-EDID read operations. In contradiction to display 20 in FIG. 7, display 20', using AD-EDID interface 24, supports bidirectional communication with host 10 via DDC 15D. AD secure mediator 300 couples the video stream of video communication protocol 15 from host 10 to display 20' via optional input video circuits 320, switch 310 and optional output video circuits 330. Optional input video circuits 320 and optional output video circuits 330 may be video format converters, video level shifters, video re-timers, video buffers, video signal amplifiers, video repeaters and the like and any combination thereof. Switch 310 may be used to block the video signals from host 10 to display 20'. Switch 310 may be incorporated within input video circuits 320, or output video circuits 330. Switch 310 is controlled by Advanced Display EDID host emulator, hereinafter for short, AD-EDID host emulator 350. AD-EDID host emulator 350 is connected to DDC 15D and communicate with Display 20'. AD-EDID host emulator 350 can perform bidirectional communication and perform handshaking with advanced display 20', using AD-EDID interface 24. For legacy operation, AD-EDID host emulator 350 may read EDID content of the AD-EDID interface 24 and write it to EDID memory 212. Optionally, for any E-EDID entries that are write once read only memories, i.e., data that is written once during manufacturing to AD-EDID interface 24, host 10 can read this data directly from EDID memory 212 similarly as have been done in secure mediator 200 of FIG. 7. Alternatively, EDID memory 212 is not presented in AD secure mediator 300 and AD-EDID display emulator 360 provides this data upon read operation from host 10. The data is provided to AD-EDID display emulator 360 by AD-EDID host emulator 350 during power-up or reset via a security enforcing communication unit 340 that will be describe in detail later on.

Unlike secure mediator 200 of FIG. 7, secure mediator 300 enables in some authorized scenarios bidirectional communication between host 10 and AD secure mediator 300 and bidirectional communication between advanced display 20' and AD secure mediator 300. This communication is conditioned upon meeting the security policy enforced by AD-EDID display emulator 360, security enforcing communication unit 340, and AD-EDID host emulator 350. In some scenarios, the bidirectional communication between host 10 and advanced display 20' may be replaced by a more secure bidirectional communication between host 10 and AD-EDID display emulator 360 and bidirectional communication between AD-EDID host emulator 350 and advanced display 20' with a restricted unidirectional communication between AD-EDID display emulator 360 and AD-EDID host emulator 350.

In the following example, there is provided a detailed description of such secure policy performed by AD secure mediator 300, when bidirectional handshake between host 10 and display 20' is required. Host 10 elects to transmit a 4K60 display mode video stream to display 20'. Host 10 may elect 4K60 mode hance in legacy EDID read only protocol, host 10 reads that advanced display 20' supports 4K60 display mode. In order to switch to the 4K60 mode, host 10 needs to inform display 20' on changing the clocking scheme by writing several bits into display's 20' AD-EDID interface 24. Note that these bits are in the direction that was not allowed in secure mediator 200 illustrated in FIG. 7. To prevent security breach AD-EDID display emulator 360 intercept this request and interpret that host 10 request to change the clocking scheme (e.g., in order to transmit 4K60 display mode video stream) to display 20'. Via security enforcing communication unit 340 AD-EDID display emulator 360 informs AD-EDID host emulator 350 of this host request to change the clocking scheme. AD-EDID display emulator 360 emulate or mimic the display operation so that when host 10 inquire display 20' if it is ready for the new clocking scheme transmission, AD-EDID display emulator 360 will acknowledge positive answer by setting the proper bits in E-EDID memory emulated by AD-EDID display emulator 360. host 10 will then start to generate the 4K60 video stream, however since AD-EDID host emulator 350 command switch 310 to be open and block the video stream, the video stream will not be transferred to display 20'. Meanwhile, AD-EDID host emulator 350 create the handshake with display 20'. First, AD-EDID host emulator 350 write the proper bits of the new clocking mode into display's 20' AD-EDID interface 24. Upon this instruction, advanced display 20' prepares its video stream receivers (e.g. set the PLLs) to be ready for the higher rate video data stream (e.g., 4K60). When advanced display 20' is ready (e.g., PLLs are locked), display 20' set the appropriate bits in its AD-EDID interface 24. When AD-EDID host emulator 350 receives the message that display 20' is ready AD-EDID host emulator 350 instruct switch 310 to pass the video signals to display 20'. The new message indication by display 20' may be done by polling at least one bit in AD-EDID interface 24 or by signaling on Hot Plug Detect (HPD) signal (a dedicated pin in DDC as recommended by the HDMI standard in this case) or the like in other present or future standards). Note that a security goal of no real time data passage from display 20' to host 10 was achieved by the above operations of AD secure mediator 300.

In an exemplary embodiment of the invention, instead of blocking the video signal by switch 310, AD-EDID display emulator 360 may delay the ready message by a predetermined duration that should be equal or greater than the time it takes display 20' to get ready. In this case, host 10 will delay the 4K60 video data stream generation internally and switch 310 is not required.

It is worth to mention that the 4K60 mode is given here by a way of example and other high data rate modes may be supported in this way. In an exemplary embodiment of the invention, security enforcing communication unit 340 is implemented using a unidirectional bus (a plurality of bits)

that encode display modes or clocking schemes that the secure mediator supports. In some cases, several modes are using the same clocking scheme hance share the same PLL setting. In this case multiple display mode may be encoded in a single message passing through the security enforcing communication unit 340.

Security enforcing communication unit 340 may be implemented as part of AD-EDID display emulator 360 or AD-EDID host emulator 350 or split between both emulators. The communication protocol used by the security enforcing communication unit 340 may take any form of communication link, including, but not limited to, plain unidirectional line between the two emulators, a plurality of unidirectional lines (i.e. a parallel bus), a serial link like SPI or I2C or the like. In an exemplary embodiment of the invention, the security enforcing communication unit 340 comprises unidirectional enforcing elements. In an exemplary embodiment of the invention, security enforcing communication unit 340 comprises a filter that blocks certain types of information or messages while allows other types of information or messages. For example, in some secure mediator's security enforcing communication unit 340 may allow MCCS, while in other secure mediator's security enforcing communication unit 340 may block MCCS commands. Security enforcing communication unit 340 may comprise a traffic analyzer to detect unusual behavior of host 10. For example, if display mode changes or brightness changes occur too often, security enforcing communication unit 340 may block further such changes and optionally, records this event in a security event log and submit an alert to a security monitoring system.

In an exemplary embodiment of the invention, for security reasons, EDID 22 (of legacy displays 20 in FIG. 7) data and/or AD-EDID 24 read only data are not a one to one copy and AD secure mediator 300 may alter some of the data so that host 10 will read different versions of EDID 22 data and/or AD-EDID 24 data.

AD secure mediator 300, in general, and security enforcing communication unit 340, in specific, may isolate DDC 15D in the host side from DDC 15D on the display side, i.e., signals on host side DDC 15D are not leaked and cannot be eavesdropped on the console premises.

Figure 8B:
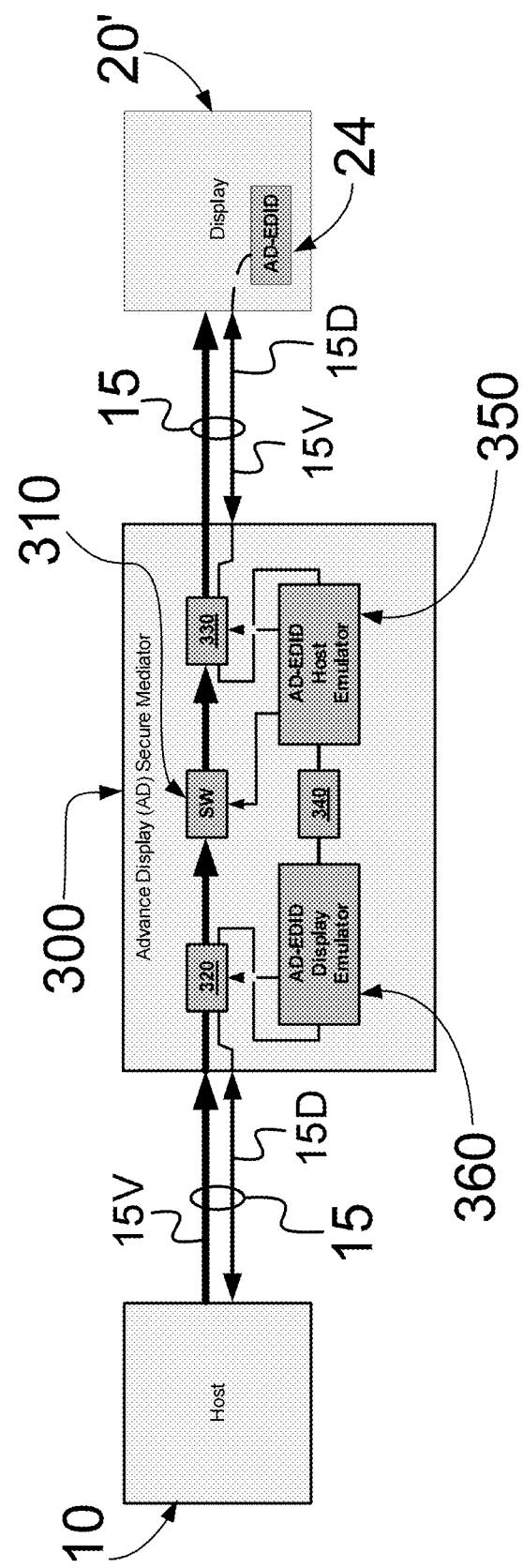
FIG. 8B is an illustration of another advanced display secure mediator.

Reference is now made to FIG. 8B. FIG. 8B illustrates another AD secure mediator with accordance to the present invention. AD secure mediator 300 comprises same elements that are in FIG. 8A, however input video circuits 320 and output video circuits 330 are processing in addition to the video stream 15V the DDC 15D. The reason for that may be that the ICs that are used to handle the video stream 15V have already provision for processing the DDC 15V. In this case, AD secure mediator 300 DDC 15D security chain of AD-EDID display emulators 360, security enforcing communication unit 340 and AD-EDID host emulator 350 is coupled between input video circuits 320 and output video circuits 330 while the DDC 15D of host 10 is coupled to input video circuits 320 and DDC 15D of display 20' is coupled to output video circuits 330. Same securities policies may be employed by this scheme as described in the scheme illustrated in FIG. 8A, however some of the functionality of the security chain (360, 340 and 350) may be done by video circuits (320, 330).

The AD secure mediator 300 in FIG. 8B also illustrate the optional control connection between emulators (360, 350) and video circuits (320, 330) respectively. This control may be needed to set the video circuits (320, 330) to a specific mode or a specific processing of video stream 15V as required by the handshaking in the DDC 15D.

Figure 9A:
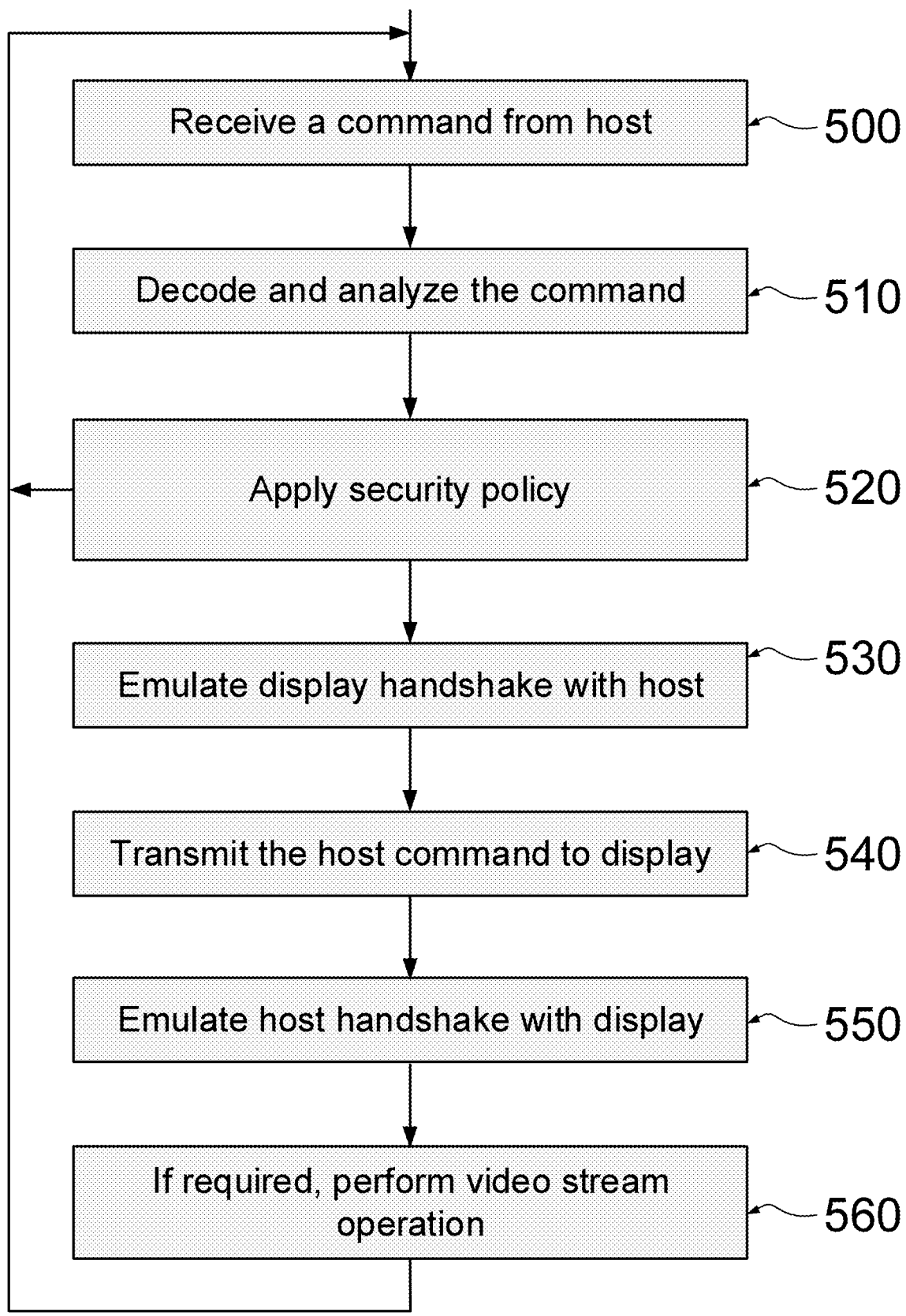
FIG. 9A is a flow chart of a method of securing the DDC in advanced display secure mediator.

Reference is now made to FIG. 9A. FIG. 9A illustrates a flow chart of a method of securing the DDC in AD secure mediator 300. The method starts in step 500 where the AD secure mediator 300 receives a command from host 10. AD secure mediator 300 encodes and analyzes the command in step 510. The host 10 command may be constructed from writing sequence of several data bits in different E-EDID locations and the AD secure mediator 300 monitors host 10 commands until the complete command is received and decoded. Upon decoding and analyzing the command, in step 520, AD secure mediator 300 apply security policy and may filter out the command, i.e., block the command and not do further processing. AD secure mediator 300 may amend the command or pass it as is to further processing. In step 530, AD secure mediator 300 emulates the handshake and act on behalf of display 20' in front of host 10. In step 540, AD secure mediator 300 emulates host 10 by sending the command (or the amended command) to display 20'. Following, in step 550, AD secure mediator 300 emulates the handshake with the display and receives display 20' reactions such as acknowledge message or the like. Finally, in step 560, if required, AD secure mediator 300 may perform any operation or control elements, components or circuitries in AD secure mediator 300 to support any processing of video stream according to host command.

Reference is now made to FIG. 9B. FIG. 9B illustrates a flow chart of the method of securing the DDC in AD secure mediator 300 with two processing elements: AD-EDID host emulator 350 and AD-EDID display emulator 360. Similar to the follow chart in FIG. 9A, the method starts in step 500 where the AD-EDID display emulator 360 receives a command from host 10. AD-EDID display emulator 360 encodes and analyzes the command in step 510. After encoding the command, in step 520*a*, AD-EDID display emulator 360 applies a security policy and may filter out the command, i.e., block the command from further processing. AD-EDID display emulator 360 may amend the command or pass the command as is for further processing. In step 520*b*, AD-EDID display emulator 360 pass the command or amended command to the AD-EDID host emulator 350. The communication between AD-EDID display emulator 360 and AD-EDID host emulator 350 is performed via security enforcing communication unit 340 that may encode block or further amend the command in step 520*c*. In step 520*d*, AD-EDID host emulator 350 waits for reception of notifications from AD-EDID display emulator 360, and upon reception of the notification, AD-EDID host emulator 350 may apply its own security policy. The security policy may be based on any information that is related to the operation history with display 20'. At this point both AD-EDID display emulator 360 and AD-EDID host emulator 350 continue to perform their method steps in parallel to fully response to host 10 command. In step 530, AD-EDID display emulator 360 emulate the handshake and act on behalf of display 20' in front of host 10. Meanwhile, in step 540, AD-EDID host emulator 350 emulates host 10 by sending the command (or the amended command) to display 20'. Following, in step 550, AD-EDID host emulator 350 emulates the handshake with display 20' and receive display 20' reactions, notifications, acknowledge messages or the like. In steps 560*a*, 560*b* and 560*c* additional steps are performed to complete the command execution. In step 560*a*, AD-EDID display emulator 360 may perform any operation in response to finishing the handshake with host 10. AD-EDID display emulator 360 may also wait for AD-EDID host emulator 350 notification to perform any operation or to enable further commands from host 10. In step 560*b*, AD-EDID host emulator 350 may perform any operation in response to finishing the handshake with display 20'. AD-EDID host emulator 350 may notify AD-EDID display emulator 360 or optionally having bidirectional handshake communication with AD-EDID display emulator 360 in step 560c. Any communication between AD-EDID host emulator 350 and AD-EDID display emulator 360 in step 560c is performed via security enforcing communication unit 340 that ensure the communication is in accordance with the security policy of AD secure mediator 300.

In the case of switching display mode using HDMI 2.0 and SCDC protocol switching from low data rate display mode (such as, 1020×720 pixels in 60 fps and 24 bit per pixel that requires 3.2 Gbit/s) to high data rate display mode (such as 4K60 that requires 12.54 Gbit/s or 5K30, i.e., 5120×2880 pixels in 30 fps at 24 bit per pixel, that requires 10.94 Gbit/s), the operation in accordance to the flow chart of the method of AD secure mediator 300 may be as follows:

- AD-EDID display emulator 360 receives a command from host 10 request to change display mode (step 500)
- Analyzing the bits changed in the E-EDID space by AD-EDID display emulator 360 decodes the command and interpret the host intention to change display mode by switching clocking scheme (step 510)
- Since in the secure policy of AD secure mediator 300 changing clocking scheme is allowable operation, AD-EDID display emulator 360 forward change clocking scheme command to AD-EDID host emulator 350 (steps 520a-520d). This command may pass through physical unidirectional enforcing link implemented by security enforcing communication unit 340.
- To notify host 10 that the display 20' is ready to get the high data rate video stream AD-EDID host emulator 350 set the proper bits (e.g., PLL is locked) in E-EDID space (step 530).
- Upon receiving the instruction from AD-EDID display emulator 360, AD-EDID host emulator 350 command display 20' to get ready to change to the new, higher clocking scheme by writing the proper bits in display's 20 E-EDID space (step 540).
- AD-EDID host emulator 350 check if display 20' ready by polling the proper bits in the E-EDID space or by checking these bits after waiting for Hot Plug Detect (HPD) signal from display 20' (step 550)
- While host 10 is already generating the high data rate video stream due to the acknowledge host 10 got from AD-EDID display emulator 360, the video stream is not delivered to display 20' since switch 310 is still open. to complete the operation, i.e., to complete the change of the display mode, AD-EDID host emulator 350 instruct switch 310 to change its state to close state, allowing the video stream to reach display 20' (step 560 or 560b). Note that in this case step 560a and step 560c is not required and only unidirectional communication is needed between AD-EDID display emulator 360 and AD-EDID host emulator 350.

In some secure policies of secure mediator, MCCS protocol is forbidden and any MCCS commands may be entirely disabled or blocked. An example for such strict policy can be found in version 3.0 of secure requirements for Protection Profile for Peripheral Sharing Switch of the National Information Assurance Partnership (NIAP) that can be downloaded from www.niap-ccevs.org/MMO/PP/pp_pss_v3.0.pdf. One reason is that the changes in brightness and contrast on the display may be used as a vulnerable, not monitored, side channel that may allow leakage of information by sending information in this channel to the display and eavesdropping the data by externally monitoring the changes on the display. This disabling policy by nature of the solution is applied using the architecture in FIG. 7 that disallow any write operation of the host on the DDC. Applying this security policy may be done in the architecture illustrated in FIGS. 8A and 8B by blocking any write operation of host 10 to the MCCS commands space in step 520. However, other less strict secure policies may be applied as well. For example, a security policy may allow MCCS power mode command (hex code $D6_h$) to be allowed so host can command the display to enter standby, suspend or off power modes. This security policy operation is performed by AD-EDID display emulator 360 in step 520 allowing only this specific command. AD-EDID display emulator 360 pass the power mode to AD-EDID host emulator 350 and AD-EDID host emulator 350 in its turn sends the MCCS power mode command (step 540) to display 20'. In addition, a monitoring may apply to check that the power mode is not abused by malicious code on the host to be used as side information data leaking channel. If such suspicious operation is detected, the MCCS protocol may be blocked. MCCS contains many types of operations including, for example, commands and handshake for calibrating CRT displays (Image Geometry Adjustment command). In some AD secure mediator 300, these specific image geometry adjustment commands in MCCS may be allowed if AD-EDID host emulator 350 detects that the display 20' is CRT display. Furthermore, such commands may be allowed only once per powering up the display and once per powering up the host. In such a case, in step 520a the secure policy regarding the host is checked and in step 520d the secure policy regarding the display is checked.

In an exemplary embodiment of the invention, security policy of limited image adjustment such as contrast and brightness may be applied in step 520. In this case the security policy may apply a frequency limits such as no more than one adjustment per hour is allowed. It is appreciated that many other security policies may be applied. that many security policies alternatives and variations will be apparent to those skilled in the art.

It is appreciated that the secured features of this invention, which are described in the context of SCDC and MCCS bidirectional DDC protocols may also be provided for various current and future DDC that comprising write enabled protocols or display-host handshaking protocols. Furthermore, the secured features of this invention may also be provided in combination with other mediator architectures and mediator configurations. For example, this advanced display secure functions may incorporated in a mediator illustrated in FIG. 2. Accordingly, the mediator, in addition to its secure function over the DDC, will support a console with additional peripheral devices that may be secured or unsecured for additional peripheral devices. Similarly, this advanced display secure functions may incorporated in a mediator illustrated in FIG. 3. Accordingly, some of the elements, such as, AD-EDID display emulator 360, EDID memory 212 and input video circuits 320 may be implemented in host side mediator 100H while other elements, such as AD-EDID host emulator 350, switch 310 and output video circuits 330 may be implemented in console side mediator 100C. Optionally, some elements may be duplicated and may be implemented in each part of the mediator. For example, to maintain signal integrity, input video circuits 320 and output video circuits 330 may be in both host side mediator 100H and console side mediator 100C.

Figure 10:
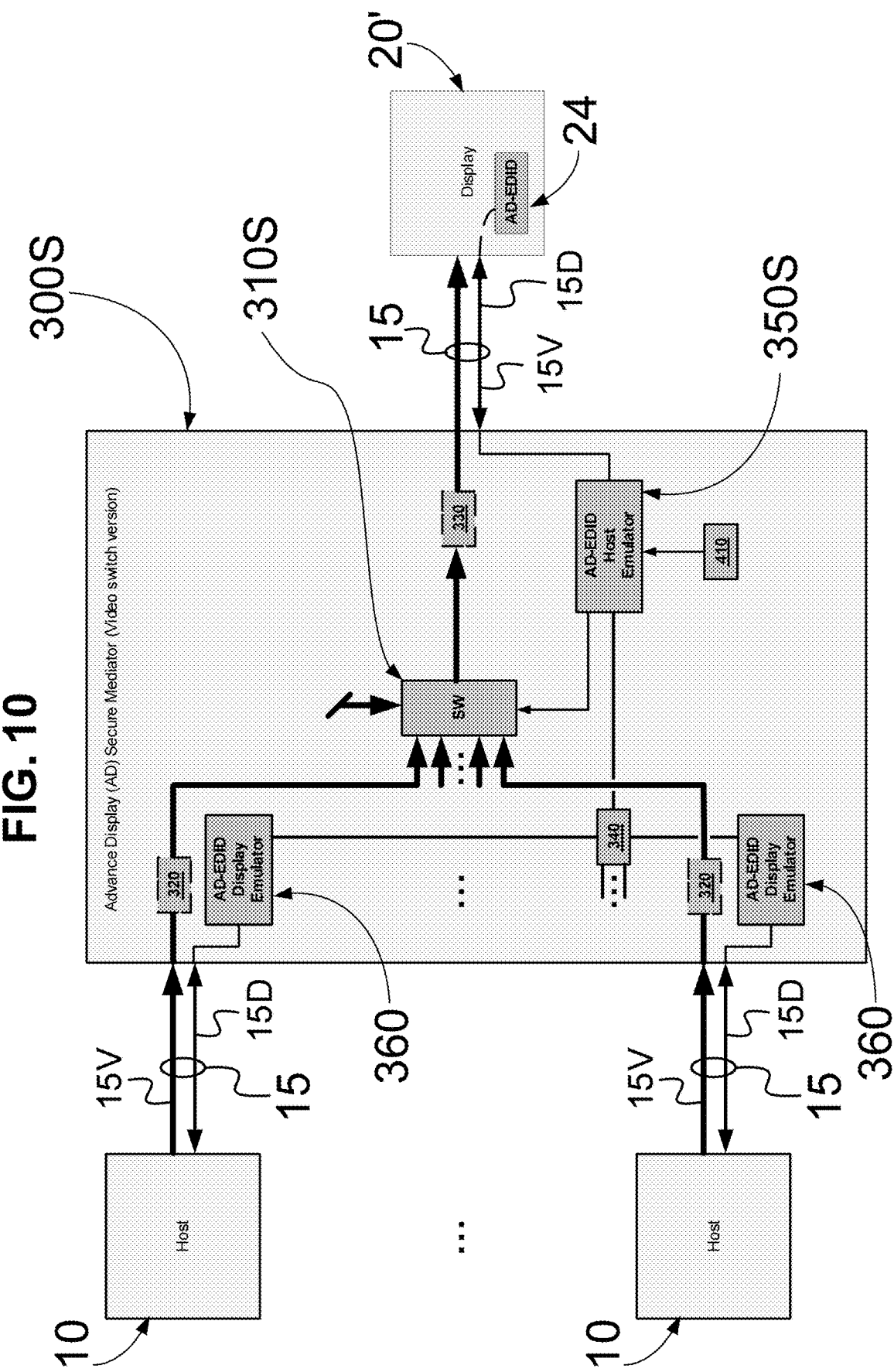
FIG. 10 is an illustration of an advanced display secure mediator, which is a video switch in accordance with the present invention.

Reference is now made to FIG. 10. FIG. 10 illustrates an AD secure mediator 300S, which is a video switch in accordance with the present invention. The architecture is similar to the mediator presented in FIG. 4 with the additional security functions presented in FIG. 8A or 8B. Each host is connected to the secure video switch (AD secure mediator 300S) via video communication protocol 15. Video communication protocol 15 may be DVI, HDMI, DP or the like. The video stream 15V from each host 10 is coupled, optionally through input video circuits 320, to switch 310S. The DDC 15D of each host 10 is coupled to an AD-EDID display emulator 360. AD-EDID display emulators 360 take the same role as in previous embodiments to emulate the handshake with hosts 10. Switch 310S has multiple video inputs, one for each host, and one video output. Optionally, switch 310S has one or more input ports that is not connected to any input video stream. Alternatively, switch 310S has an open mode which does not connect any video input to the video output of switch 310. The video output of switch 310S is connected to advanced display 20', optionally through output video circuits 330. switch 310S is used to select which host video stream is presented in display 20'. The selection is made by AD-EDID host emulator 350S that get the selection requirements from element 410. Element 410 may be a user interface such as a buttons or knob on secure mediator 300S or a communication link from another controller in the secure mediator, or the like. For example, secure mediator 300S may support a plurality of console devices such as multiple displays, keyboard, mouse and other peripheral devices. In this case, typically a system controller coordinates all operations of the secure mediator (e.g., the secure KVM switch). The system controller may send through communication link 410 the instruction from which host 10 the video stream should be coupled to display 20'. The AD-EDID display emulators 360 are connected to AD-EDID host emulator 350S via security enforcing communication unit 340. As in previous embodiment, optionally, the function of the security enforcing communication unit 340 may be implemented on the AD-EDID display emulators 360 or AD-EDID host emulator 350S or both, optionally left unit 340 to be a plain communication unit.

In an exemplary embodiment of the invention, when a specific host 10 is active and the host 10 elects to change display mode that induce DDC 15D handshaking with display 20', the secure functions of secure mediator 300S will perform the same secure operation as illustrated in FIGS. 8A, 8B, 9A and 9B and described in the accompanying text hereinabove. This switch configuration of secure mediator may have additional secure features and secure policies that are presented herein next.

Suppose each one of hosts 10 works in a different display mode. If an instruction to switch active host comes from element 410, display 20' may need to be informed of the new video stream format. It should be noted that if, for example, the previous active host and the next active host are generating video in the same display mode or different display mode but with the same clocking scheme, a new DDC 15D handshake between the mediator 300S may not be needed. In these cases, AD-EDID host emulator 350S may just change the setting of switch 310S and display 20' will adapt automatically to the new display mode. To support this type of dynamic operation AD-EDID host emulator 350S may store a table with the present display mode or present clocking scheme of each of the hosts and on each active host switching event decide upon this table, if simple video switch is sufficient or setting new clocking scheme using handshake with display 20' is required. In the latter case, first AD-EDID host emulator 350S will emulate the host request to change the clocking scheme while setting switch 310S to disable (block) the output video stream, then, when display 20' is ready, AD-EDID host emulator 350S will instruct switch 310 to enable (pass) the video stream of the newly selected host.

In an exemplary embodiment of the invention, MCCS data space, SCDC data space and the like are stored in tables in each event of switching active host.

Another situation that need to be taken in this video switch architecture is the situation when an inactive host elects to switch mode. Several policies might be taken here. The first one is to keep all hosts (including the inactive hosts) video streams working so, in this case, the relevant AD-EDID display emulator 360 will handshake with the host and send acknowledge, and the host will generate the new video stream. However, this video stream will not pass switch 310S since the host is not active. The relevant AD-EDID display emulator 360 reports this event to the AD-EDID host emulator 350S and AD-EDID host emulator 350S in its turn updates the table so when this host become active, if required, the necessary handshake of DDC 15D will occurs. Another policy may be to hold all hosts' requests until it become the active host.

In an exemplary embodiment of the invention, secure mediator 300S is a secure KVM switch with console comprising, in addition to the display, at least a keyboard and a mouse.

In an exemplary embodiment of the invention, security enforcing communication unit 340 ensure isolation between DDC 15D of the hosts, i.e., no data can pass between DDC 15D channels of the hosts as well as no signal leakage between DDC 15D of the hosts so that eavesdropping between host is not possible.

In an exemplary embodiment of the invention, security enforcing communication unit 340 is implemented as a separate isolated communication link between each of the AD-EDID display emulator 360 and AD-EDID host emulator 350S.

In an exemplary embodiment of the invention, the security policy of AD secure mediator 300S allows some support for write-enabled and/or handshake MCCS features. An example of security threat in video switches that support MCCS is that the brightness, contrast or the like data will be set by one host and be read by another host so that it creates a communication channel between two isolated host via the DDCs and the display. In an exemplary embodiment of the invention, AD-EDID host emulator 350 keep a copy of all MCCS space values when switching the display between hosts 10. Upon return to the same host a copy back of the MCCS data is made to display 20'. In an exemplary embodiment of the invention, AD-EDID host emulator 350 reset the values in display 20' before switching between hosts 10. The above security policies guarantee that hosts will not be able to transfer information between them over the MCCS space.

In an exemplary embodiment of the invention, AD secure mediators 300 or 300S secure policy allows MCCS operation. An analyzer or monitor may be implemented in security enforcing communication unit 340 to detect suspicious use of the MCCS channel for sending information. When such behavior is detected, the MCCS channel may be disabled, an alert may be asserted, and/or log event may be recorded. In addition, AD-EDID host emulator 350S may track the value of the brightness, contrast or the like data on any switching host event, and before switching to another host, AD-EDID host emulator 350S set the data in display 20' to reflect the same data that was before the switch or alternatively set the data with a default values at the beginning and/or end of each host video switching event.

Figure 11:
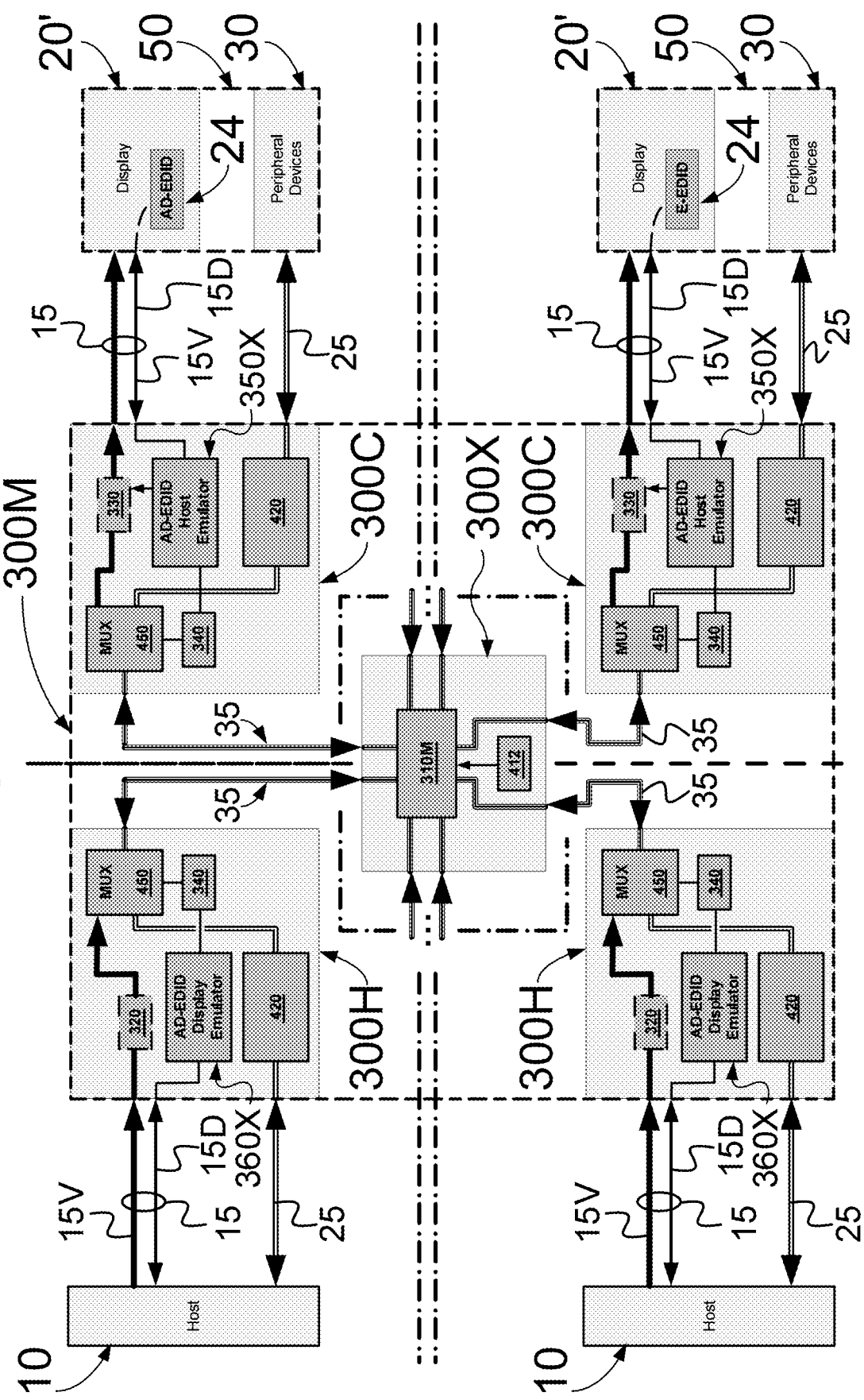
FIG. 11 is an illustration of an advanced display secure mediator, which is a console/KVM matrix in accordance with the present invention.

Reference is now made to FIG. 11. FIG. 11 illustrates an AD secure mediator 300M comprises of three types of elements host side mediator 300H, core mediator 300X, and console side mediator 300C. An example for such mediator is secure KVM matrix similar to the one illustrated in FIG. 5. Each host 10 is connected to the host side mediator 300H using video communication protocol 15, which comprises from video channel 15V and Display Data Channel (DDC) 15D. Optionally, more than one video communication protocol 15 is supported by host 10. Host 10 is connected to the host side mediator 300H with one or more additional communication protocols 25. Peripheral devices communication protocols 25 are used to communicate all other peripheral devices 30 in console 50. Host side mediator 300H comprises AD-EDID display emulator 360X that is connected to DDC 15D. The suffix 'X' indicated that AD-EDID display emulator 360X is dedicated to work in a matrix configuration as describe herein. Host side mediator 300H comprises input video circuits 320, and console support circuitries 420. Input video circuits 320 has the same function as describe above, and in many cases, comprises a video conversion to support a single unified video format that is supported by multiplexers/demultiplexers 450 and core matrix 310M. Multiplexer/demultiplexer 450, multiplex i.e., aggregates, all data from the host to be send to the core mediator 300X. These data include the video stream the data from host 10 to peripheral devices 30 transmitted over peripheral devices communication protocols 25 and the data from AD-EDID display emulator 360X directed to AD-EDID host emulator 350X. To ensure secure function and secure polices, the data before entering multiplexer/demultiplexer 450 goes through security enforcing communication unit 340. Security enforcing communication unit 340 may be implemented in AD-EDID display emulator 360X. To prevent eavesdropping security enforcing communication unit 340 may perform encryption/decryption functions as well as implement authentication protocol to establish communication between AD-EDID display emulator 360X and AD-EDID host emulator 350X. Multiplexer/demultiplexer 450 also performs demultiplexing of data coming from console devices 30 through core mediator 300X. These data may be keyboard and mouse inputs. Optionally, the data can be bidirectional data between security enforcing communication units 340 of host side mediator 300H and console side mediator 300C.

Console support circuitries 420 support all function needed to support the communication between peripheral devices 30 and host 10 including security functions but since they are not the focus of the present invention they are not describe in detail in the specification. Multiplexer/demultiplexer 450 is connected or coupled to core mediator 300X via core communication link 35. As described above, core communication link 35 is bidirectional communication link that aggregates all data transmitted from host 10 and all data transmitted to host 10. In many cases, the enclosure of host side mediator 300H and the enclosure of core mediator 300X are deployed far from each other and core communication link 35 is a long-haul communication link. Core communication link 35 may be IP based and core communication link 35 maybe the Internet. Alternatively, core communication link 35 may be optical fiber or the like.

In an exemplary embodiment of the invention, AD secure mediator 300M is implemented in a single enclosure and host side mediators 300H, core mediator 300X, and console side mediator 300C are in the same enclosure and core communication links 35 are implemented as copper cables or copper traces on a PCB inside the enclosure.

The number of host side mediator 300H supported by secure mediator, n, may be any integer number equal or greater than 2. Host side mediator 300H may be located in different locations or in proximity to each other. For example, host side mediators 300H may be deployed in a company premises, e.g., a building, with two or more separate rooms (host computer farms), e.g., farms that are located in opposite sides of the building. Each farm comprises a plurality of host computer and the core communication link 35 may be in this case the organization LAN.

Console side mediators 300C support consoles 50 and may reside in different locations than host side mediators 300H. The number of console side mediator 300H supported by AD secure mediator 300M, m, may be any integer number equal or greater than 2. In some cases, m will be less or equal to n to allow all n users operating n consoles 50 having at least one host 10 for each user to work with. In the above company premises example, console side mediators 300C are deployed in rooms in which the employers work, and if a room is occupied by a single employee, i.e., a single user, a single console side mediator 300C is deployed, where if a room is occupied by four employees, four console side mediators 300C are deployed. Further in this company premises example, all console side mediators 300C are connected to the LAN, e.g., via Ethernet RJ45 sockets located on the room's walls, which is the core communication link 35 in this example. In addition, some console side mediators 300C may be deployed in conference rooms, classrooms or the like to allow uses to be coupled to host 10 from other location that are not their regular working space. Additionally or alternatively, users can be connected to hosts remotely using a device 300C connected through the Internet from one side and to the console devices from the other side.

Console side mediator 300C comprises multiplexer/demultiplexer 450 that multiplex data originated from the console and demultiplex data originated from host 10. Video stream data goes from multiplexer/demultiplexer 450 to output video circuits 330. Output video circuits 330 may convert the standard video format in the core mediator 300X to the video format supported by display 20'. Other type of video signal components such as video level shifters, video re-timers, video buffers, video signal amplifiers, video repeaters and the like may be used. Optionally, output video circuits 330 may switch-off/cut-off the video stream by instruction from AD-EDID host emulator 350X. From output video circuits 330 the video stream data is transferred to display 20' using video channel 15V.

AD-EDID display emulator 360X data that come from core communication link 35 go from multiplexer/demultiplexer 450 to AD-EDID host emulator 350X through security enforcing communication unit 340, which can be implemented as part of AD-EDID host emulator 350X. AD-EDID host emulator 350X is connected to DDC 15D which is connected to the Advance Display (AD) EDID interface 24 of advanced display 20'. Optionally where secure policy enables bidirectional communication between AD-EDID display emulator 360X and AD-EDID host emulator 350X, data from AD-EDID host emulator 350X goes through security enforcing communication units 340 and multiplexed into core communication link 35 data by multiplexer/demultiplexer 450.

Data from/to peripheral devices 30 of console 50 is transferred over peripheral devices communication protocols 25 to console support circuitries 420 that exchange data through with host side mediator's 300H console support circuitries 420 to support the additional peripheral device mediator functionalities, preferably also secure peripherals mediator functionalities.

As described above, the number of console side mediator 300C, m, may be greater or equal to 2 and the locations of deployment of each console side mediator 300C may be different.

The core mediator 300X performs the couple between the n hosts, i.e., the n host side mediator 300H and the m consoles, i.e., the m console side mediator 300C. Typically, the coupling is 1:1 and if m≠n some hosts or consoles will not be coupled. The core mediator 300X dynamically establish pairs of AD-EDID display emulator 360X and AD-EDID host emulator 350X. Core mediator 300X is connected to the n core communication links 35 from host side mediators 300H and the m core communication links 35 from the console side mediators 300C. In the heart of core mediator 300X there is matrix 310M that can connect between any link 35 from the host side to any link 35 from the console side. The setup of the matrix, i.e., determining the connections (i,j) to establish, where i is in {1 to n} and j is in {1 to m}, is instructed from element 412. Element 412 may be independent administration system, that controls and supervises mediator 300M, or a circuitry that monitors special matrix setting commands transmitted over the core communication links 35. The command may be initiated by the peripherals 30 or by dedicated software that is running on hosts 10 and in its turn operated by the users of consoles 50.

In an exemplary embodiment of the invention, console 50 may comprise non advanced legacy display 20. In this case AD-EDID host emulator support a legacy EDID secure operation as explained hereinabove.

To conclude the description of this embodiment of the invention, the situation where two users, i.e., two consoles, are connected to two hosts is considered. assuming an administrator decide to switch between the setup (1,1), (2,2) to (1,2), (2,1), i.e., switch between consoles and computers. Assuming that one console, m=1, comprises non advance display and is using legacy 4K30 (4K resolution @ 30 fps) display mode and the other console, m=2, comprises advance display and is using 4K60 display mode. If a plain switching of the video stream is performed, the most likely result is that both users will see black screens since both displays receivers are not set to receive the new video stream modes. To make this switching works, element 412 send a message to both AD-EDID display emulators 360X to emulate a display change. Upon receiving this message each AD-EDID display emulator 360X signals, optionally through Hot Plug Detect (HPD) signal, that a display was changed. Upon this signal, each of the hosts will re-read new EDID/E-EDID data and decide which new display mode to work with the corresponding new display. The hosts will communicate over DDC with AD-EDID display emulators 360X the new display modes and AD-EDID display emulators 360X will acknowledge that the display is ready to work in this display mode. Note that in the case of host n=2 that previously worked with 4K60 display mode, now after reading the EDID data of the new display the new display mode will be 4K30. Meanwhile, AD-EDID display emulators 360X will communicate over the core matrix, each with its new AD-EDID host emulator 350X, optionally AD-EDID display emulators 360X will authenticate new AD-EDID host emulator 350X to ensure, among other things, that they meet the security policy. When the respective change display mode message is received by the AD-EDID host emulators 350X they will emulate the act of the respective host over the respective DDCs 15D to change the display mode (if needed) in each display and stop/resume the video stream using output video circuits 330 as needed. As in other AD secure mediators 300 and 300S the hosts 10 did not been able to communicate directly over DDC 15D with the displays 20 or 20' and only communication that was allowed by security enforcing communication units 340 could be transferred between the pairs of AD-EDID display emulator 360X and AD-EDID host emulator 350X.

In an exemplary embodiment of the invention, advanced display secure mediator (300, 300S, 300M) couples between one or more hosts 10 and one or more displays (20, 20') over video communication protocols 15. The mediator comprises: one or more input video circuits 320 configured to receive from video channels of the video communication protocols 15 that are coupled to the hosts; one or more output video circuits 340 configured to transmit to video channels 15V of the video communication protocols 15 that are coupled to the displays (20, 20'); one or more AD-EDID display emulators (360, 360X) configured to be coupled to Display Data Channels 15D of the video communication protocols 15 that are coupled to the hosts 10; one or more AD-EDID host emulators (350, 350S, 350X) configured to be coupled to Display Data Channels 15D of the video communication protocols 15 that are coupled to the displays (20, 20'); and security enforcing communication units 340 that are configured to couple between the pairs of AD-EDID display emulator (360, 360X) and AD-EDID host emulator (350, 350S, 350X).

Each of the AD-EDID host emulators (350, 350S, 350X) is configured to perform bidirectional communication over DDC 15D with advanced display 21' and emulate host operation and behavior. Each of the AD-EDID display emulators (360, 360X) is configured to perform bidirectional communication over DDC 15D with the host 10 and emulate display 21' operation and behavior. Advanced display secure mediator (300, 300S, 300M) is configured to couple video streams 15V from input video circuits 320 to output video circuits 340 and condition upon said emulators operations effect said video streams 15. Security enforcing communication units 340 are configured to perform security functions from at least one of or any combination of the following security functions/operation: (1) enforcing unidirectional communication between the pairs of AD-EDID host emulators and AD-EDID display emulators; (2) authenticating the pairs of AD-EDID host emulators and AD-EDID display emulators; (3) blocking or filtering out undesired data transmission between the pairs of AD-EDID host emulators and AD-EDID display emulators; (4) blocking, locking, neutralizing or stopping the communication between the pairs of AD-EDID host emulators and AD-EDID display emulators; (5) encrypting and decrypting the communication between the pairs of AD-EDID host emulators and AD-EDID display emulators; (6) logging, auditing or alerting events; (7) auditing the communication between the AD-EDID host emulators and the AD-EDID display emulators; (8) analyzing the communication between the AD-EDID host emulators and the AD-EDID display emulators; (9) preventing data transfer between non-paired emulators; (10) preventing signal leakage between the emulators; (11) encoding and decoding display mode information and messages between the AD-EDID host emulators and the 1AD-EDID display emulators; (12) isolating between the DDCs of the hosts; (13) isolating the communication between different pairs of AD-EDID display emulators and the AD-EDID host emulators.

AD-EDID display emulators (300, 300S, 300M) of AD secure mediator (300, 300S, 300M) are configured to perform security functions from at least one of or any combination of blocking or filtering out host commands; emulating E-EDID data on behalf of the display; updating or changing a copy of E-EDID data read from the display; controlling the video stream between the host and the display; and applying security policy for handshaking with the hosts. AD-EDID host emulators (350, 350S, 350X) of AD secure mediator (300, 300S, 300M) are configured to perform security functions from at least one of or any combination of blocking or filtering out commands directed to the display; emulating bidirectional communication on behalf of the host; updating or changing a copy of E-EDID data read from the display; controlling the video stream between the host and the display; and applying security policy for handshaking with the display.

In an exemplary embodiment of the invention, the coupling of host 10 to advance display 20' by advanced display secure mediator (300, 300S, 300M) using video communication protocol 15 that comprises video channel and Display Data Channel 15D is performed by the following steps:
  (a) receiving a command from host 10 through the DDC 15D;
  (b) detecting and analyzing the command;
  (c) applying security policy to the command and upon compliance with security policy performing the following steps:
  (d) emulating the behavior of advanced display 20' and performing a handshake with host 10;
  (e) transmitting the command to advanced display 20' through the DDC 15D;
  (f) emulating the behavior of host 10 in front of advanced display 20' and performing a handshake with the advanced display 20'; and
  (g) if required or desired, performing operation on video stream 15V of the video communication protocol.

The security policy further comprises one of or any combination of (1) enforcing unidirectional communication between display-side DDC and host-side DDC; (2) blocking or filtering out undesired data transmission between display-side DDC and host-side DDC; (3) logging, auditing, or alerting events; (4) analyzing DDC communication between host and the mediator; (5) analyzing DDC communication between display and the mediator; (6) preventing transfer of data between DDCs of different hosts; and (7) preventing transfer of data between DDCs of different displays.

In an exemplary embodiment of the invention, advanced display secure mediator (300, 300S, 300M) comprises: one or more AD-EDID display emulators (360, 360X) configured to be coupled to DDCs 15D of the video communication protocols 15 that are coupled to one or more hosts 10; one or more AD-EDID host emulators (350, 350S, 350X) configured to be coupled to DDCs 15D of the video communication protocols that are coupled to one or more displays (20, 20'); and security enforcing communication units 340 that are configured to couple between the pairs of AD-EDID display emulator (360, 360X) and the AD-EDID host emulator (350, 350S, 350X). Steps (a), (b) and (d) hereinabove are performed by the AD-EDID display emulator, and steps (e) and (f) hereinabove are performed by the AD-EDID host emulator. step (c) hereinabove is performed by at least one of or any combination of AD-EDID display emulators (360, 360X); AD-EDID host emulators (350, 350S, 350X); and security enforcing communication units 340. The security policy further comprises one of or any combination of: (1) enforcing unidirectional communication between the pairs of AD-EDID host emulators and AD-EDID display emulators; (2) authenticating the pairs of AD-EDID host emulators and AD-EDID display emulators; (3) blocking or filtering out undesired data transmission between the pairs of AD-EDID host emulators and AD-EDID display emulators; (4) blocking, locking, neutralizing or stopping communication between the pairs of AD-EDID host emulators and AD-EDID display emulators; (5) encrypting and decrypting communication between pairs of the AD-EDID host emulators and the AD-EDID display emulators; (6) logging, auditing and alerting events created by the hosts or the displays; (7) analyzing communication between AD-EDID host emulators and AD-EDID display emulators; (8) preventing data transfer between non-paired emulators; (9) preventing signal leakage between emulators; (10) encoding, decoding, encrypting and decrypting messages between AD-EDID host emulators and AD-EDID display emulators; (11) isolating between the DDCs of the hosts; and (12) isolating communication links between the pairs of AD-EDID display emulators and AD-EDID host emulators. Step (g) hereinabove is performed by at least one of or any combination of AD-EDID display emulators (360, 360X); AD-EDID host emulators (350, 350S, 350X); and security enforcing communication units 340 and may perform the same security policy mentioned hereinabove.

In an exemplary embodiment of the invention, the advanced display secure mediator (300, 300S, 300M) performs copying of EDID data 22 from a legacy display 20 into an internal storage 212 at power up or reset and allowing only reading of EDID data by host 10 from the copy reside in said internal storage 212.

In an exemplary embodiment of the invention, AD secure mediator (300, 300S or 300M) support handshake communication to support Multi-Stream Transport (MST) capabilities of video communication protocol.

It is expected that during the life of a patent maturing from this application many relevant video communication protocols, DDC, advanced display features and handshaking protocols will be developed, and the scope of these terms is intended to includes all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An advanced display (AD) secure mediator for coupling between one or more hosts and one or more displays over video communication protocols comprises:
   one or more input video circuits configured to receive from video channels of the video communication protocols that are coupled to the hosts;
   one or more output video circuits configured to transmit to video channels of the video communication protocols that are coupled to the displays;
   one or more AD-EDID display emulators configured to be coupled to Display Data Channels (DDCs) of the video communication protocols that are coupled to the hosts;
   one or more AD-EDID host emulators configured to be coupled to Display Data Channels (DDCs) of the video communication protocols that are coupled to the displays; and
   security enforcing communication units that are configured to couple between pairs of the AD-EDID display emulators and the AD-EDID host emulators,
   wherein each of the AD-EDID host emulators is configured to perform bidirectional communication over the DDC with the advanced display and emulate host operation and behavior, each of the AD-EDID display emulators is configured to perform bidirectional communication over the DDC with the host and emulate display operation and behavior, the mediator is configured to couple video streams from input video circuits to output video circuits and condition upon said emulators operations effect said video streams; and the security enforcing communication units are configured to perform security functions from at least one of or any combination of (1) enforcing unidirectional communication between the pairs of AD-EDID host emulators and AD-EDID display emulators, (2) authenticating the pairs of AD-EDID host emulators and AD-EDID display emulators, (3) blocking or filtering out undesired data transmission between the pairs of AD-EDID host emulators and AD-EDID display emulators, (4) blocking, locking, neutralizing or stopping the communication between the pairs of AD-EDID host emulators and AD-EDID display emulators, (5) encrypting and decrypting the communication between the pairs of AD-EDID host emulators and AD-EDID display emulators, (6) logging, auditing or alerting events, (7) auditing the communication between the AD-EDID host emulators and the AD-EDID display emulators, (8) analyzing the communication between the AD-EDID host emulators and the AD-EDID display emulators, (9) preventing data transfer between non-paired emulators, (10) preventing signal leakage between the emulators, (11) encoding and decoding display mode information and messages between the AD-EDID host emulators and the AD-EDID display emulators, (12) isolating between the DDCs of the hosts, and (13) isolating the communication between different pairs of AD-EDID display emulators and AD-EDID host emulators.

2. The AD secure mediator of claim 1, wherein the bidirectional communication over the DDC is at least one of MCCS, SCDC, or both.

3. The AD secure mediator of claim 1, wherein the mediator further supports one or more consoles comprising one or more peripheral devices.

4. The AD secure mediator of claim 1, wherein the mediator further comprises a host side enclosure and a console side enclosure and the host side enclosure coupled to the console side enclosure by intra-communication protocol.

5. The AD secure mediator of claim 1, wherein the mediator is a video format converter.

6. The AD secure mediator of claim 1, wherein the mediator is a distance extender.

7. The AD secure mediator of claim 1, wherein the mediator is a video switch.

8. The AD secure mediator of claim 7, wherein the mediator stores a table with the state of at least one of or any combination of (1) display mode, (2) clocking scheme, (3) MCCS data space, and (4) SCDC data space, in each event of switching active host.

9. The AD secure mediator of claim 1, wherein the mediator is a KVM switch.

10. The AD secure mediator of claim 1, wherein the mediator is a console switch.

11. The AD secure mediator of claim 1, wherein the mediator is a video combiner.

12. The AD secure mediator of claim 1, wherein the mediator is a KVM matrix.

13. The AD secure mediator of claim 1, wherein the mediator support legacy EDID security function of allowing the host to only read a copy of the display EDID data that was copied at power up or reset.

14. The AD secure mediator of claim 1, wherein the mediator further comprises one or more switches that are configured to block the video stream from the hosts to the displays.

15. The AD secure mediator of claim 1, wherein the AD-EDID display emulators are configured to perform security functions from at least one of or any combination of (1) blocking or filtering out host commands, (2) emulating E-EDID data on behalf of the display, (3) updating or changing a copy of E-EDID data read from the display, (4) controlling the video stream between the host and the display, and (5) applying security policy for handshaking with the hosts.

16. The AD secure mediator of claim 1, wherein the AD-EDID host emulators is configured to perform security functions from at least one of or any combination of (1) blocking or filtering out commands directed to the display, (2) emulating bidirectional communication on behalf of the host, (3) updating or changing a copy of E-EDID data read from the display, (4) controlling the video stream between the host and the display, and (5) applying security policy for handshaking with the display.

17. A method for coupling host to advance display by an advanced display secure mediator, the coupling is made using video communication protocol comprises video channel and Display Data Channel (DDC), the method comprises the steps of:
   (a) receiving a command from the host through the DDC;
   (b) detecting and analyzing the command;
   (c) applying security policy to the command and upon compliance with security policy performing the following steps:
   (d) emulating the behavior of the advanced display and performing a handshake with the host;
   (e) transmitting the command to the advanced display through the DDC;
   (f) emulating the behavior of the host in front of the advanced display and performing a handshake with the advanced display; and
   (g) if required or desired, performing operation on a video stream of the video communication protocol.

18. The method of claim 17, wherein the security policy further comprises one of or any combination of (1) enforcing unidirectional communication between display-side DDC and host-side DDC, (2) blocking or filtering out undesired data transmission between display-side DDC and host-side DDC, (3) logging, auditing, or alerting events, (4) analyzing DDC communication between host and the mediator, (5) analyzing DDC communication between display and the mediator, (6) preventing transfer of data between DDCs of different hosts, and (7) preventing transfer of data between DDCs of different displays.

19. The method of claim 17, wherein the advanced display secure mediator further comprises:
one or more AD-EDID display emulators configured to be coupled to DDCs of the video communication protocols that are coupled to one or more hosts;
one or more AD-EDID host emulators configured to be coupled to DDCs of the video communication protocols that are coupled to one or more displays; and
security enforcing communication units that are configured to couple between pairs of the AD-EDID display emulators and the AD-EDID host emulators,
wherein steps (a), (b) and (d) are performed by the AD-EDID display emulator, and steps (e) and (f) are performed by the AD-EDID host emulator.

20. The method of claim 19, wherein step (c) is performed by at least one of or any combination of:
(i) AD-EDID display emulators,
(ii) AD-EDID host emulators, and
(iii) security enforcing communication units, and
wherein the security policy further comprises one of or any combination of:
(1) enforcing unidirectional communication between the pairs of AD-EDID host emulators and AD-EDID display emulators, (2) authenticating the pairs of AD-EDID host emulators and AD-EDID display emulators, (3) blocking or filtering out undesired data transmission between the pairs of AD-EDID host emulators and AD-EDID display emulators, (4) blocking, locking, neutralizing or stopping communication between the pairs of AD-EDID host emulators and AD-EDID display emulators, (5) encrypting and decrypting communication between pairs of AD-EDID host emulators and the AD-EDID display emulators, (6) logging, auditing and alerting events created by the hosts or the displays, (7) analyzing communication between AD-EDID host emulators and AD-EDID display emulators, (8) preventing data transfer between non-paired emulators, (9) preventing signal leakage between emulators, (10) encoding, decoding, encrypting and decrypting messages between AD-EDID host emulators and AD-EDID display emulators, (11) isolating between the DDCs of the hosts, and (12) isolating communication links between the pairs of AD-EDID display emulators and AD-EDID host emulators.

21. The method of claim 19, wherein step (g) is performed by at least one of or any combination of (1) AD-EDID display emulators, (2) AD-EDID host emulators, and (3) security enforcing communication units.

22. The method of claim 19, wherein the method further comprises a step of coordination between the pairs of AD-EDID display emulators and AD-EDID host emulators, through security enforcing communication units.

23. The method of claim 17, wherein the advanced display secure mediator is a KVM switch.

24. The method of claim 17, wherein the AD secure mediator is a video combiner.

25. The method of claim 17, wherein the AD secure mediator is a KVM matrix.

26. The method of claim 17, wherein the method further comprises the steps of copying EDID data from a legacy display into an internal storage at power up or reset and allowing only reading of EDID data by the host from the copy in said internal storage.

* * * * *